United States Patent
Jiang et al.

(10) Patent No.: US 11,425,738 B2
(45) Date of Patent: Aug. 23, 2022

(54) METHOD AND DEVICE IN UE AND BASE STATION FOR WIRELESS COMMUNICATION

(71) Applicants: Qi Jiang, Shanghai (CN); Xiaobo Zhang, Shanghai (CN)

(72) Inventors: Qi Jiang, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 26 days.

(21) Appl. No.: 16/872,397

(22) Filed: May 12, 2020

(65) Prior Publication Data

US 2020/0288484 A1     Sep. 10, 2020

Related U.S. Application Data

(63) Continuation of application No. PCT/CN2017/111127, filed on Nov. 15, 2017.

(51) Int. Cl.
*H04W 72/12*     (2009.01)
*H04L 1/18*     (2006.01)
(Continued)

(52) U.S. Cl.
CPC ....... *H04W 72/1257* (2013.01); *H04L 1/0004* (2013.01); *H04L 1/1819* (2013.01);
(Continued)

(58) Field of Classification Search
None
See application file for complete search history.

(56) References Cited

U.S. PATENT DOCUMENTS

2013/0163532 A1   6/2013   Anderson et al.
2018/0199268 A1*   7/2018   Wang ................ H04W 48/12

FOREIGN PATENT DOCUMENTS

CN    101730247 A    6/2010
CN    102378383 A    3/2012
(Continued)

OTHER PUBLICATIONS

CN 1st Office Action received in application No. 201780094779.X dated Jun. 9, 2022.
(Continued)

*Primary Examiner* — Scott M Sciacca

(57) ABSTRACT

The disclosure provides a method and a device in a User Equipment (UE) and a base station for wireless communication. The UE receives a first signaling in a first time-frequency resource, then receives a second signaling in a second time-frequency resource, or transmits a second signaling in a second time-frequency resource, and finally operates a first radio signal; the first signaling is a Semi-Persistent Scheduling (SPS) signaling, and the first time-frequency resource is located before the second time-frequency resource in time domain; the first signaling comprises first configuration information, the first configuration information is applicable to the first radio signal; the second signaling is used for determining a first multiantenna related parameter. The disclosure adjusts the multiantenna related parameter for semi-persistent data transmission through a dynamic signaling, thus improves the efficiency of data transmission and the flexibility of scheduling and improves the overall performance of system.

20 Claims, 14 Drawing Sheets

(51) Int. Cl.
*H04L 1/00* (2006.01)
*H04W 24/10* (2009.01)
*H04W 72/04* (2009.01)
*H04W 72/14* (2009.01)

(52) U.S. Cl.
CPC ....... *H04W 24/10* (2013.01); *H04W 72/0446* (2013.01); *H04W 72/0453* (2013.01); *H04W 72/0493* (2013.01); *H04W 72/14* (2013.01)

(56) References Cited

FOREIGN PATENT DOCUMENTS

| CN | 106658742 A | 5/2017 |
| WO | 2013096555 A1 | 6/2013 |
| WO | 2014078981 | 5/2014 |
| WO | 2017148381 A1 | 9/2017 |

OTHER PUBLICATIONS

CN 1st Search Report received in application No. 201780094779.X dated Jun. 1, 2022.
3GPP tsg_ran\WG1_RL1 Qualcomm Incorporated R1-1611604 "Remainingdetails on uplink DMRSfor FD-MIMO" Nov. 5, 2016.

\* cited by examiner

METHOD AND DEVICE IN UE AND BASE STATION FOR WIRELESS COMMUNICATION

CROSS REFERENCE TO RELATED APPLICATIONS

This application is a continuation of International Application No. PCT/CN2017/111127, filed on Nov. 15, 2017, claiming the priority benefit of International Application PCT/CN2017/111127, filed on Nov. 15, 2017, the full disclosure of which is incorporated herein by reference.

BACKGROUND

Technical Field

The disclosure relates to transmission methods and devices in wireless communication systems, and in particular to a transmission method and device for radio signals supporting data transmission based on Semi-Persistent Scheduling (SPS).

Related Art

At present, technical discussions about 5G New Radio Access Technology (NR) are ongoing. Massive Multi-Input Multi-Output (MIMO) becomes a research hotspot of next-generation mobile communications. In the massive MIMO, multiple antennas experience beamforming to form a relatively narrow beam which points to a particular direction to improve the quality of communication. When a number of panels equipped at a User Equipment (UE) is limited, a number of beamforming vectors of the UE used for simultaneous reception is limited too. Meanwhile, 5G systems will still support data transmission based on SPS, so as to implement services with data amount and transmission periodicity fixed using a few dynamic scheduling signalings.

Therefore, when a UE supports SPS and massive MIMO simultaneously, a new scheme needs to be proposed.

SUMMARY

Data scheduling based on SPS allows one time of scheduling to serve multiple time units, thereby reducing overheads and loss of dynamic signalings. However, for UEs supporting massive MIMO, when one UE performs data transmission based on SPS in multiple time units, the UE needs to receive using a same receiving beamforming vector or to transmit using a same antenna port. Since a base station needs to provide services to other UEs in timeslots occupied by the SPS transmission, the SPS transmission will result in that only one transmission mode of beamforming can be employed in the time units occupied by the SPS, which will impact system performances. In view of the above problem, one simple solution is that the SPS employs a wider beam to perform transmission; however, this solution will reduce the efficiency of transmission obviously.

In view of the design, the disclosure provides a solution. It should be noted that the embodiments of the UE of the disclosure and the characteristics in the embodiments may be applied to the base station if no conflict is incurred, and vice versa. The embodiments of the disclosure and the characteristics in the embodiments may be mutually combined arbitrarily if no conflict is incurred.

The disclosure provides a method in a UE for wireless communication, wherein the method includes:

receiving a first signaling in a first time-frequency resource;

receiving a second signaling in a second time-frequency resource, or transmitting a second signaling in a second time-frequency resource; and operating a first radio signal.

Herein, the first signaling is an SPS signaling, and the first time-frequency resource is located before the second time-frequency resource in time domain; the first signaling includes first configuration information, the first configuration information is applicable to the first radio signal, and the first configuration information includes at least one of occupied frequency-domain resources, a Modulation and Coding Status (MCS) or a Hybrid Automatic Repeat Request (HARM) process number; the operating is receiving, or, the operating is transmitting; the second signaling is used for determining a first multiantenna related parameter, and the first multiantenna related parameter is applicable to the first radio signal.

In one embodiment, the above method is characterized in that: through the second signaling, the first multiantenna related parameter for the first radio signal is dynamically adjusted; thus, multiantenna parameters for a given data block in multiple data blocks in SPS transmission can be changed in time through a dynamic signaling, so as to adjust configurations of a receiving beam or a transmitting antenna port of the given data block.

In one embodiment, the above method has the following benefits: when a base station employs a beam which is not the same one configured by the original SPS to perform transmission in time-domain resources occupied by the first radio signal, or when the channel condition of the UE changes, the second signaling supports dynamically configuring the beam employed by a certain transmission block in SPS transmission, thereby improving performances of system and the flexibility of scheduling.

According to one aspect of the disclosure, the above method includes:

operating a second radio signal.

Herein, time-domain resources occupied by the second radio signal are located before time-domain resources occupied by the second time-frequency resource, the first configuration information is applicable to the second radio signal, and the second radio signal is unrelated to the first multiantenna related parameter.

In one embodiment, the above method has the following benefits: the first multiantenna related parameter configured by the second signaling is one-shot and does not impact SPS transmissions other than the first radio signal; the above method ensures the robustness of SPS transmission while improving the flexibility of configuration of the first multiantenna related parameter.

According to one aspect of the disclosure, the above method includes:

operating a third radio signal.

Herein, the UE receives the second signaling, the second signaling includes second configuration information, and the second configuration information includes at least one of occupied frequency domain resources, an MCS or a HARQ process number; and the second configuration information is applicable to the third radio signal.

In one embodiment, the above method has the following benefits: besides configuring one time of transmission for SPS, that is, the multiantenna parameter of the first radio signal, the second signaling further configures one dynamic scheduling for the UE, that is, the third radio signal, thereby realizing multiple functions of the second signaling, improving the efficiency of the second signaling, and reducing the number of times of blind decoding of the UE and the overheads of control signalings.

According to one aspect of the disclosure, the above method includes:

receiving a fourth radio signal.

Herein, the UE transmits the second signaling, and a measurement for the fourth radio signal is used for triggering the transmitting of the second signaling.

In one embodiment, the above method has the following benefits: the UE directly recommends the first multiantenna related parameter for the first radio signal to the base station through the second signaling, further saving the overheads of downlink control signalings and improving the efficiency of transmission.

According to one aspect of the disclosure, the above method includes:

receiving a third signaling.

Herein, the second signaling includes Q fields, the Q being a positive integer greater than 1, only a first field among the Q fields is used for the UE, the first field is one of the Q fields, and the third signaling is used for determining the first field from the Q fields.

In one embodiment, the above method has the following benefits: the second signaling is used for one group of UEs, further improving the coding efficiency of the second signaling and reducing the overheads of control signalings.

According to one aspect of the disclosure, the above method includes:

receiving first information.

Herein, the first information is used for determining a target time unit set, and the target time unit set includes T time units, the T being a positive integer greater than 1; the UE operates the first radio signal in a first time unit, and the first time unit belongs to the target time unit set.

In one embodiment, the above method is characterized in that: the first information is higher-layer configuration information for the SPS transmission including the first radio signal.

According to one aspect of the disclosure, the above method is characterized in that: the first signaling is downlink control information for downlink grant, and the operating is receiving; or, the first signaling is downlink control information for uplink grant, and the operating is transmitting.

The disclosure provides a method in a base station for wireless communication, wherein the method includes:

transmitting a first signaling in a first time-frequency resource;

transmitting a second signaling in a second time-frequency resource, or receiving a second signaling in a second time-frequency resource; and executing a first radio signal.

Herein, the first signaling is an SPS signaling, and the first time-frequency resource is located before the second time-frequency resource in time domain; the first signaling includes first configuration information, the first configuration information is applicable to the first radio signal, and the first configuration information includes at least one of occupied frequency-domain resources, an MCS or a HARQ process number; the executing is transmitting, or, the executing is receiving; the second signaling is used for determining a first multiantenna related parameter, and the first multiantenna related parameter is applicable to the first radio signal; and a receiver of the first signaling includes a first terminal.

According to one aspect of the disclosure, the above method includes:

executing a second radio signal.

Herein, time-domain resources occupied by the second radio signal are located before time-domain resources occupied by the second time-frequency resource, the first configuration information is applicable to the second radio signal, and the second radio signal is unrelated to the first multiantenna related parameter.

According to one aspect of the disclosure, the above method includes:

executing a second radio signal.

Herein, time-domain resources occupied by the second radio signal are located before time-domain resources occupied by the second time-frequency resource, the first configuration information is applicable to the second radio signal, and the second radio signal is unrelated to the first multiantenna related parameter.

According to one aspect of the disclosure, the above method includes:

executing a third radio signal.

Herein, the first terminal receives the second signaling, the second signaling includes second configuration information, and the second configuration information includes at least one of occupied frequency domain resources, an MCS or a HARQ process number; and the second configuration information is applicable to the third radio signal.

According to one aspect of the disclosure, the above method includes:

transmitting a fourth radio signal.

Herein, the first terminal transmits the second signaling, and a measurement for the fourth radio signal is used for triggering the transmitting of the second signaling.

According to one aspect of the disclosure, the above method includes:

transmitting a third signaling.

Herein, the second signaling includes Q fields, the Q being a positive integer greater than 1, only a first field among the Q fields is used for the first terminal, the first field is one of the Q fields, and the third signaling is used for determining the first field from the Q fields.

According to one aspect of the disclosure, the above method includes:

transmitting first information.

Herein, the first information is used for determining a target time unit set, and the target time unit set includes T time units, the T being a positive integer greater than 1; the base station executes the first radio signal in a first time unit, and the first time unit belongs to the target time unit set.

According to one aspect of the disclosure, the above method is characterized in that: the first signaling is downlink control information for downlink grant, and the executing is transmitting; or, the first signaling is downlink control information for uplink grant, and the executing is receiving.

The disclosure provides a UE for wireless communication, wherein the UE includes:

a first receiver, to receive a first signaling in a first time-frequency resource;

a first transceiver, to receive a second signaling in a second time-frequency resource, or to transmit a second signaling in a second time-frequency resource; and a second transceiver, to operate a first radio signal.

Herein, the first signaling is an SPS signaling, and the first time-frequency resource is located before the second time-frequency resource in time domain; the first signaling includes first configuration information, the first configuration information is applicable to the first radio signal, and the first configuration information includes at least one of occupied frequency-domain resources, an MCS or a HARQ process number; the to operate is to receive, or, the to operate is to transmit; the second signaling is used for determining a first multiantenna related parameter, and the first multiantenna related parameter is applicable to the first radio signal.

In one embodiment, the above UE for wireless communication is characterized in that: the first transceiver further operates a second radio signal; time-domain resources occupied by the second radio signal are located before time-domain resources occupied by the second time-frequency resource, the first configuration information is applicable to the second radio signal, and the second radio signal is unrelated to the first multiantenna related parameter; the operate is receive, or, the operate is transmit.

In one embodiment, the above UE for wireless communication is characterized in that: the first transceiver further operates a third radio signal; the UE receives the second signaling, the second signaling includes second configuration information, and the second configuration information includes at least one of occupied frequency domain resources, an MCS or a HARQ process number; and the second configuration information is applicable to the third radio signal; the operate is receive, or, the operate is transmit.

In one embodiment, the above UE for wireless communication is characterized in that: the first transceiver further receives a fourth radio signal; the UE transmits the second signaling, and a measurement for the fourth radio signal is used for triggering the transmitting of the second signaling.

In one embodiment, the above UE for wireless communication is characterized in that: the first receiver further receives a third signaling; the second signaling includes Q fields, the Q being a positive integer greater than 1, only a first field among the Q fields is used for the UE, the first field is one of the Q fields, and the third signaling is used for determining the first field from the Q fields.

In one embodiment, the above UE for wireless communication is characterized in that: the first receiver further receives first information; the first information is used for determining a target time unit set, and the target time unit set includes T time units, the T being a positive integer greater than 1; the UE operates the first radio signal in a first time unit, and the first time unit belongs to the target time unit set; the operate is receive, or, the operate is transmit.

In one embodiment, the above UE for wireless communication is characterized in that: the first signaling is downlink control information for downlink grant, and the to operate is to receive; or, the first signaling is downlink control information for uplink grant, and the to operate is to transmit.

The disclosure provides a base station for wireless communication, wherein the base station includes:

a first transmitter, to transmit a first signaling in a first time-frequency resource;

a third transceiver, to transmit a second signaling in a second time-frequency resource, or to receive a second signaling in a second time-frequency resource; and a fourth transceiver, to execute a first radio signal.

Herein, the first signaling is an SPS signaling, and the first time-frequency resource is located before the second time-frequency resource in time domain; the first signaling includes first configuration information, the first configuration information is applicable to the first radio signal, and the first configuration information includes at least one of occupied frequency-domain resources, an MCS or a HARQ process number; the to execute is to transmit, or, the to execute is to receive; the second signaling is used for determining a first multiantenna related parameter, and the first multiantenna related parameter is applicable to the first radio signal; and a receiver of the first signaling includes a first terminal.

In one embodiment, the above base station for wireless communication is characterized in that: the third transceiver further executes a second radio signal; time-domain resources occupied by the second radio signal are located before time-domain resources occupied by the second time-frequency resource, the first configuration information is applicable to the second radio signal, and the second radio signal is unrelated to the first multiantenna related parameter; the execute is transmit, or, the execute is receive.

In one embodiment, the above base station for wireless communication is characterized in that: the third transceiver further executes a third radio signal; the first terminal receives the second signaling, the second signaling includes second configuration information, and the second configuration information includes at least one of occupied frequency domain resources, an MCS or a HARQ process number; and the second configuration information is applicable to the third radio signal; the execute is transmit, or, the execute is receive.

In one embodiment, the above base station for wireless communication is characterized in that: the third transceiver further transmits a fourth radio signal; the first terminal transmits the second signaling, and a measurement for the fourth radio signal is used for triggering the transmitting of the second signaling.

In one embodiment, the above base station for wireless communication is characterized in that: the first transmitter further transmits a third signaling; the second signaling includes Q fields, the Q being a positive integer greater than 1, only a first field among the Q fields is used for the first terminal, the first field is one of the Q fields, and the third signaling is used for determining the first field from the Q fields.

In one embodiment, the above base station for wireless communication is characterized in that: the first transmitter further transmits first information; the first information is used for determining a target time unit set, and the target time unit set includes T time units, the T being a positive integer greater than 1; the base station executes the first radio signal in a first time unit, and the first time unit belongs to the target time unit set; the execute is transmit, or, the execute is receive.

In one embodiment, the above base station for wireless communication is characterized in that: the first signaling is downlink control information for downlink grant, and the to execute is to transmit; or, the first signaling is downlink control information for uplink grant, and the to execute is to receive.

In one embodiment, compared with conventional schemes, the disclosure has the following advantages.

Through the second signaling, multiantenna parameters for a data block in SPS transmission at a given time are adjusted dynamically, thereby avoiding preset SPS scheduling impacting following dynamic scheduling, and improving the flexibility of scheduling and the utilization of spectrum.

Besides configuring one time of transmission for SPS, that is, the multiantenna parameter of the first radio signal, the second signaling further configures one dynamic scheduling data for the UE, that is, the third radio signal, thereby realizing multiple functions of the second signaling, improving the efficiency of the second signaling, and reducing the number of times of blind decoding of the UE and the overheads of control signalings.

The UE directly recommends the first multiantenna related parameter for the first radio signal to the base station through the second signaling, further saving the overheads of downlink control signalings and improving the efficiency of transmission.

The second signaling is a dynamic signaling for one group of UEs, which can dynamically adjust multiantenna parameters corresponding to the data of multiple UEs in SPS at one time, thereby further improving the coding efficiency of the second signaling and reducing the overheads of control signalings.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
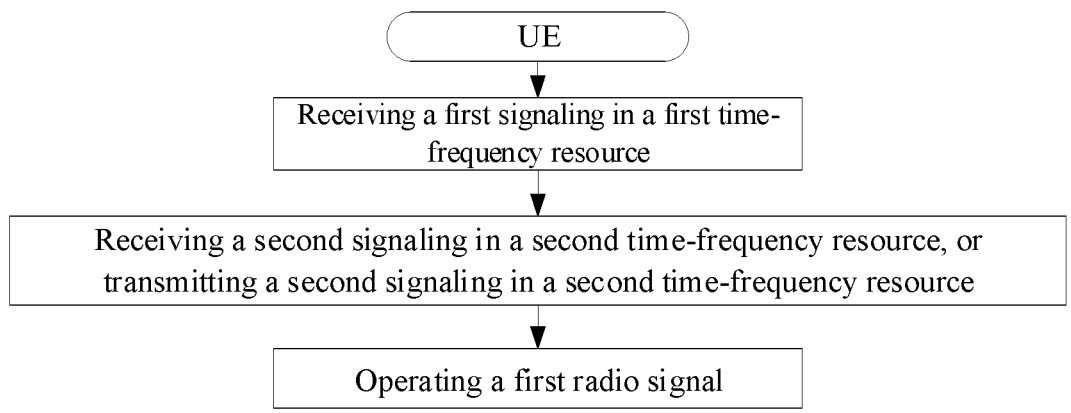
FIG. 1 is a flowchart of a first signaling according to one embodiment of the disclosure.

Embodiment 1 illustrates an example of a flowchart of first information, as shown in FIG. 1.

In Embodiment 1, the UE in the disclosure first receives a first signaling in a first time-frequency resource, then receives a second signaling in a second time-frequency resource or transmits a second signaling in a second time-frequency resource, and finally operates a first radio signal; the first signaling is an SPS signaling, and the first time-frequency resource is located before the second time-frequency resource in time domain; the first signaling includes first configuration information, the first configuration information is applicable to the first radio signal, and the first configuration information includes at least one of occupied frequency-domain resources, an MCS or a HARQ process number; the operate is receive, or, the operate is transmit; the second signaling is used for determining a first multiantenna related parameter, and the first multiantenna related parameter is applicable to the first radio signal.

In one subembodiment, the operate is receive, and the first configuration information is used for determining frequency domain resources occupied by the first radio signal, a MCS- and a HARQ process number.

In one subembodiment, the operate is transmit, and the UE generates the first radio signal according to the first configuration information.

In one subembodiment, the first signaling is a physical layer signaling.

In one subembodiment, the second signaling is a physical layer signaling.

In one subembodiment, the phrase that the first signaling is an SPS signaling refers that: unless receiving a new scheduling signaling, the UE sequentially receives or transmits a radio signal in every eligible slot.

In one subembodiment, the phrase that the first signaling is an SPS signaling refers that: the first signaling is Downlink Control Information (DCI) identified by a SPS-C (Cell)-Radio Network Temporary Identifier (RNTI).

In one subembodiment, the second signaling indicates a Transmission Configuration Indicator (TCI).

In one affiliated embodiment of the above subembodiment, the TCI indicates implicitly the first multiantenna related parameter.

In one affiliated embodiment of the above subembodiment, the TCI indicates explicitly the first multiantenna related parameter.

In one subembodiment, the first multiantenna related parameter includes a transmitting antenna port.

In one subembodiment, the first multiantenna related parameter includes a transmitting antenna port group.

In one subembodiment, the first multiantenna related parameter includes a first vector group, the first vector group includes a positive integer number of vectors, each of the positive integer number of vectors is used for generating a beamforming employed by one antenna port, and the antenna port is used for operating the first radio signal.

In one affiliated embodiment of the above subembodiment, the operating is transmitting.

In one subembodiment, the first multiantenna related parameter includes a first vector group, the first vector group includes a positive integer number of vectors, each of the positive integer number of vectors is used for generating a beamforming employed by one receiving beam, and the receiving beam is used for receiving the first radio signal.

In one affiliated embodiment of the above subembodiment, the operating is receiving.

In one subembodiment, the first signaling is used for semi-persistently scheduling M bit blocks, a first bit block among the M bit blocks generates the first radio signal, (M−1) bit blocks among the M bit blocks other than the first bit block are operated in a first frequency band, the first bit block is operated in a second frequency band, the first frequency and the second frequency band are orthogonal in frequency domain.

In one affiliated embodiment of the above subembodiment, the M bit blocks correspond to M Transmission Blocks (TBs).

In one affiliated embodiment of the above subembodiment, the first frequency band and the second frequency band correspond to one carrier respectively.

In one affiliated embodiment of the above subembodiment, the first frequency band and the second frequency band correspond to one Bandwidth Part (BWP) respectively.

In one affiliated embodiment of the above subembodiment, the first signaling is used for determining the first frequency band.

In one affiliated embodiment of the above subembodiment, the first frequency band is configured through a higher layer signaling.

In one subembodiment, frequency domain resources occupied by the first radio signal and frequency domain resources occupied by the second radio signal belong to one same BWP.

In one subembodiment, frequency domain resources occupied by the first radio signal and frequency domain resources occupied by the second radio signal belong to one same carrier.

In one subembodiment, the first time-frequency resource is one Control Resource Set (CORESET).

In one subembodiment, the second time-frequency resource is one CORESET.

In one subembodiment, transport channels corresponding to the first radio signal and the second radio signal are a Downlink Shared Channel (DL-SCH).

In one subembodiment, transport channels corresponding to the first radio signal and the second radio signal are an Uplink Shared Channel (UL-SCH).

Embodiment 2

Figure 2:
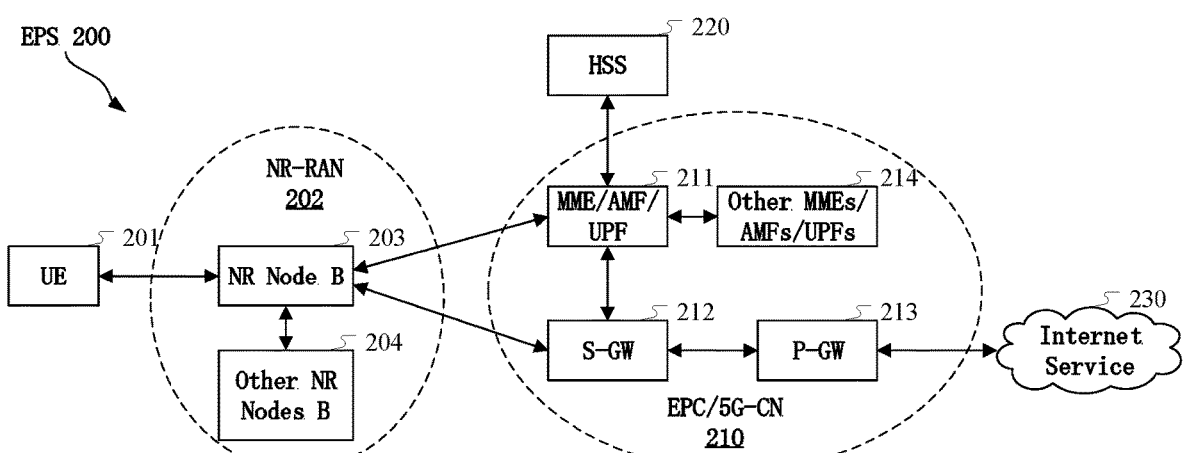
FIG. 2 is a diagram illustrating a network architecture according to one embodiment of the disclosure.

Embodiment 2 illustrates an example of a diagram of a network architecture, as shown in FIG. 2.

Embodiment 2 illustrates an example of a diagram of a network architecture according to the disclosure, as shown in FIG. 2. FIG. 2 is a diagram illustrating a network architecture 200 of NR 5G Long-Term Evolution (LTE) and Long-Term Evolution Advanced (LTE-A) systems. The NR 5G or LTE network architecture 200 may be called an Evolved Packet System (EPS) 200 or some other appropriate terms. The EPS 200 may include one or more UEs 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes a first NR node (gNB) 203 and other NR nodes 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), satellite radios, non-territorial network base station communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one subembodiment, the UE 201 corresponds to the UE in the disclosure.

In one subembodiment, the gNB 203 corresponds to the base station in the disclosure.

In one subembodiment, the UE 201 supports wireless communication based on SPS data transmission.

In one subembodiment, the gNB 203 supports wireless communication based on SPS data transmission.

In one subembodiment, the UE 201 supports massive MIMO wireless communication.

In one subembodiment, the gNB 203 supports massive MIMO wireless communication.

Embodiment 3

Figure 3:
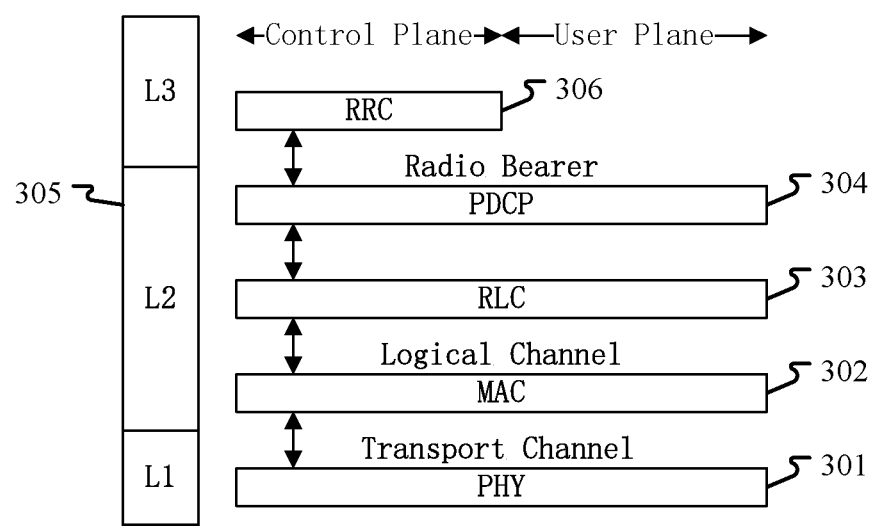
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a UE and a base station (gNB or eNB) is represented by three layers, which are a Layer 1, a Layer 2 and a Layer 3 respectively. The Layer 1 (L1 layer) is the lowest layer and implements various PHY (physical layer) signal processing functions.

The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one subembodiment, the radio protocol architecture shown in FIG. 3 is applicable to the UE in the disclosure.

In one subembodiment, the radio protocol architecture shown in FIG. 3 is applicable to the base station in the disclosure.

In one subembodiment, the first signaling in the disclosure is generated on the PHY 301.

In one subembodiment, the second signaling in the disclosure is generated on the PHY 301.

In one subembodiment, the second signaling in the disclosure is generated on the MAC sublayer 302.

In one subembodiment, the third signaling in the disclosure is generated on the RRC sublayer 306.

In one subembodiment, the first information in the disclosure is generated on the RRC sublayer 306.

Embodiment 4

Figure 4:
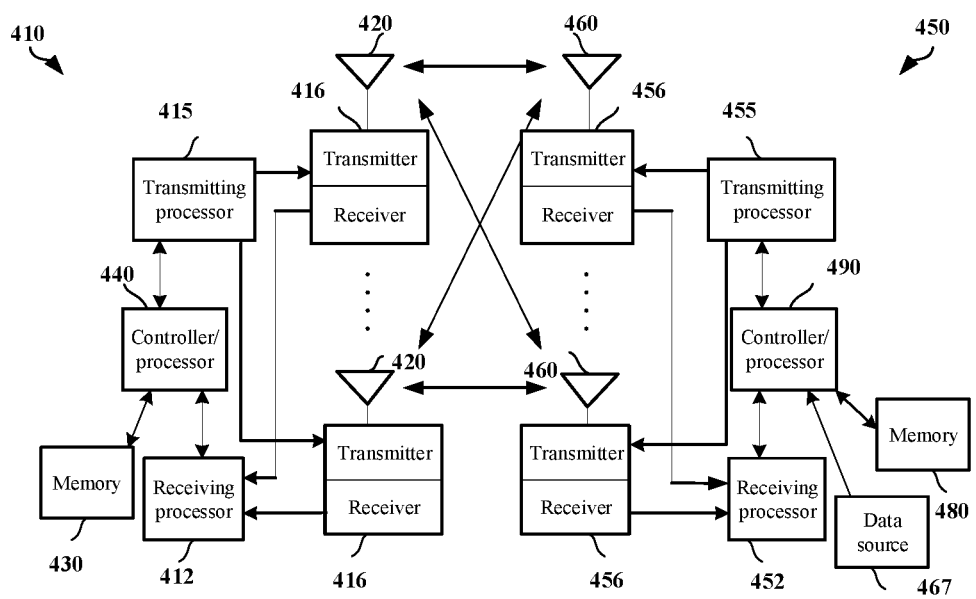
FIG. 4 is a diagram illustrating an eNB and a UE according to one embodiment of the disclosure.

Embodiment 4 illustrates a diagram of a base station and a UE according to the disclosure, as shown in FIG. 4. FIG. 4 is a block diagram of a gNB 410 in communication with a UE 450 in an access network.

The base station 410 includes a controller/processor 440, a memory 430, a receiving processor 412, a transmitting processor 415, a transmitter/receiver 416 and an antenna 420.

The UE 450 includes a controller/processor 490, a memory 480, a data source 467, a transmitting processor 455, a receiving processor 452, a transmitter/receiver 456 and an antenna 460.

In Downlink (DL) transmission, processes relevant to the base station 410 include the following.

A higher-layer packet is provided to the controller/processor 440. The controller/processor 440 provides header compression, encryption, packet segmentation and reordering, multiplexing and de-multiplexing between a logical channel and a transport channel, to implement L2 protocols used for the user plane and the control plane. The higher-layer packet may include data or control information, for example, Downlink Shared Channel (DL-SCH).

The controller/processor 440 is connected to the memory 430 that stores program codes and data. The memory 430 may be a computer readable medium.

The controller/processor 440 includes a scheduling unit for transmission requirements, and the scheduling unit is configured to schedule air interface resources corresponding to transmission requirements.

The controller/processor 440 determines a first signaling and determines a second signaling.

The transmitting processor 415 receives a bit stream output from the controller/processor 440, and performs various signal transmitting processing functions of L1 layer (that is, PHY), including encoding, interleaving, scrambling, modulation, power control/allocation, generation of physical layer control signalings (including PBCH, PDCCH, PHICH, PCFICH, reference signal), etc.

The transmitter 416 is configured to convert the baseband signal provided by the MIMO transmitting processor 441 into a radio-frequency signal and transmit the radio-frequency signal via the antenna 420. Each transmitter 416 performs sampling processing on respective input symbol streams to obtain respective sampled signal streams. Each transmitter 416 performs further processing (for example, digital-to-analogue conversion, amplification, filtering, up conversion, etc.) on respective sampled streams to obtain a downlink signal.

In Downlink (DL) transmission, processes relevant to the UE 450 include the following.

The receiver 456 is configured to convert a radio-frequency signal received via the antenna 460 into a baseband signal and provide the baseband signal to receiving processor 452.

The receiving processor 452 performs various signal receiving processing functions of an L1 layer (that is, PHY), including decoding, de-interleaving, descrambling, demodulation, extraction of physical layer control signaling, etc.

The controller/processor 490 determines a first signaling and determines a second signaling.

The controller/processor 490 receives a bit stream output from the receiving processor 452, and provides header decompression, decryption, packet segmentation and reordering, multiplexing and de-multiplexing between a logical channel and a transport channel, to implement L2 protocols used for the user plane and the control plane.

The controller/processor 490 is connected to the memory 480 that stores program codes and data. The memory 480 may be a computer readable medium.

In UL transmission, processes relevant to the base station 410 include the following.

The receiver 416 receives a radio-frequency signal received via the corresponding antenna 420, converts the received radio-frequency signal into a baseband signal and provides the baseband signal to the receiving processor 412.

The receiving processor 412 performs various signal receiving processing functions of an L1 layer (that is, PHY), including decoding, de-interleaving, descrambling, demodulation, extraction of physical layer control signaling, etc.

The controller/processor 440 performs functions of L2 layer, and is connected to the memory 430 that stores program code and data.

The controller/processor 440 provides de-multiplexing between a logical channel and a transport channel, packet reassembling, decryption, header decompression and control signaling processing to recover a higher-layer packet from the UE 450. The higher-layer packet from the UE 450 may be provided to the core network.

The controller/processor 440 determines a first signaling and determines a second signaling.

In Uplink (UL) transmission, processes relevant to the UE 450 include the following.

The data source 467 provides a higher-layer packet to the controller/processor 490. The data source 467 represents all protocol layers above L2 layer.

The transmitter 456 transmits a radio-frequency signal via the corresponding antenna 460, converts a baseband signal into a radio-frequency signal and provides the radio-frequency radio to the corresponding antenna 460.

The transmitting processor 444 performs various signal receiving processing functions of an L1 layer (that is, PHY), including decoding, deinterleaving, descrambling, demodulation and extraction of physical layer control signalings, etc.

The controller/processor 490 provides header compression, encryption, packet segmentation and reordering, multiplexing between a logical channel and a transport channel based on radio resource allocation of the gNB 410, to implement the L2 functions used for the user plane and the control plane.

The controller/processor 459 is also in charge of HARQ operation, retransmission of lost packets, and signalings to the gNB 410.

The controller/processor 490 determines a first signaling and determines a second signaling.

In one subembodiment, the UE 450 includes at least one processor and at least one memory. The at least one memory includes computer program codes. The at least one memory and the computer program codes are configured to be used in collaboration with the at least one processor. The UE 450 at least receives a first signaling in a first time-frequency resource, receives a second signaling in a second time-frequency resource or transmits a second signaling in a second time-frequency resource, and operates a first radio signal; the first signaling is an SPS signaling, and the first time-frequency resource is located before the second time-frequency resource in time domain; the first signaling includes first configuration information, the first configuration information is applicable to the first radio signal, and the first configuration information includes at least one of occupied frequency-domain resources, an MCS or a HARQ process number; the operate is receive, or, the operate is transmit; the second signaling is used for determining a first multiantenna related parameter, and the first multiantenna related parameter is applicable to the first radio signal.

In one subembodiment, the UE 450 includes a memory that stores a computer readable instruction program. The computer readable instruction program generates an action when executed by at least one processor. The action includes: receiving a first signaling in a first time-frequency resource, receiving a second signaling in a second time-frequency resource or transmitting a second signaling in a second time-frequency resource, and operating a first radio signal; the first signaling is an SPS signaling, and the first time-frequency resource is located before the second time-frequency resource in time domain; the first signaling includes first configuration information, the first configuration information is applicable to the first radio signal, and the first configuration information includes at least one of occupied frequency-domain resources, an MCS or a HARQ process number; the operating is receiving, or, the operating is transmitting; the second signaling is used for determining a first multiantenna related parameter, and the first multiantenna related parameter is applicable to the first radio signal.

In one subembodiment, the gNB 410 device includes at least one processor and at least one memory. The at least one memory includes computer program codes. The at least one memory and the computer program codes are configured to be used in collaboration with the at least one processor. The gNB 410 at least transmits a first signaling in a first time-frequency resource, transmits a second signaling in a second time-frequency resource or receives a second signaling in a second time-frequency resource, and executes a first radio signal; the first signaling is an SPS signaling, and the first time-frequency resource is located before the second time-frequency resource in time domain; the first signaling includes first configuration information, the first configuration information is applicable to the first radio signal, and the first configuration information includes at least one of occupied frequency-domain resources, an MCS or a HARQ process number; the execute is transmit, or, the execute is receive; the second signaling is used for determining a first multiantenna related parameter, and the first multiantenna related parameter is applicable to the first radio signal; and a receiver of the first signaling includes the UE 450.

In one embodiment, the gNB 410 includes a memory that stores a computer readable instruction program. The computer readable instruction program generates an action when executed by at least one processor. The action includes transmitting a first signaling in a first time-frequency resource, transmitting a second signaling in a second time-frequency resource or receiving a second signaling in a second time-frequency resource, and executing a first radio signal; the first signaling is an SPS signaling, and the first time-frequency resource is located before the second time-frequency resource in time domain; the first signaling includes first configuration information, the first configuration information is applicable to the first radio signal, and the first configuration information includes at least one of occupied frequency-domain resources, an MCS or a HARQ process number; the executing is transmitting, or, the executing is receiving; the second signaling is used for determining a first multiantenna related parameter, and the first multiantenna related parameter is applicable to the first radio signal; and a receiver of the first signaling includes the UE 450.

In one subembodiment, the UE 450 corresponds to the UE in the disclosure.

In one subembodiment, the gNB 410 corresponds to the base station in the disclosure.

In one subembodiment, the controller/processor 490 is used for determining at least one of the first signaling or the second signaling in the disclosure.

In one subembodiment, at least the former two of the receiver 456, the receiving processor 452 and the controller/processor 490 are used for receiving a first signaling in a first time-frequency resource.

In one subembodiment, at least the former two of the receiver 456, the receiving processor 452 and the controller/processor 490 are used for receiving a second signaling in a second time-frequency resource.

In one subembodiment, at least the former two of the receiver 456, the receiving processor 452 and the controller/processor 490 are used for receiving at least the former three of the first radio signal, the second radio signal, the first information, the third radio signal, the fourth radio signal or the third signaling in the disclosure.

In one subembodiment, at least the former two of the transmitter 456, the transmitting processor 455 and the controller/processor 490 are used for transmitting at least the former two of the first radio signal, the second radio signal or the third radio signal in the disclosure.

In one subembodiment, at least the former two of the transmitter 456, the transmitting processor 455 and the controller/processor 490 are used for transmitting a second signaling in a second time-frequency resource.

In one subembodiment, the controller/processor 440 is used for determining at least one of the first signaling or the second signaling in the disclosure.

In one subembodiment, at least the former two of the transmitter 416, the transmitting processor 415 and the controller/processor 440 are used for transmitting a first signaling in a first time-frequency resource.

In one subembodiment, at least the former two of the transmitter 416, the transmitting processor 415 and the controller/processor 440 are used for transmitting a second signaling in a second time-frequency resource.

In one subembodiment, at least the former two of the transmitter 416, the transmitting processor 415 and the controller/processor 440 are used for transmitting at least the former three of the first radio signal, the second radio signal, the first information, the third radio signal, the fourth radio signal or the third signaling in the disclosure.

In one subembodiment, at least the former two of the receiver 416, the receiving processor 412 and the controller/processor 440 are used for receiving at least the former two of the first radio signal, the second radio signal or the third radio signal in the disclosure.

In one subembodiment, at least the former two of the receiver 416, the receiving processor 412 and the controller/processor 440 are used for receiving a second signaling in a second time-frequency resource.

Embodiment 5

Figure 5:
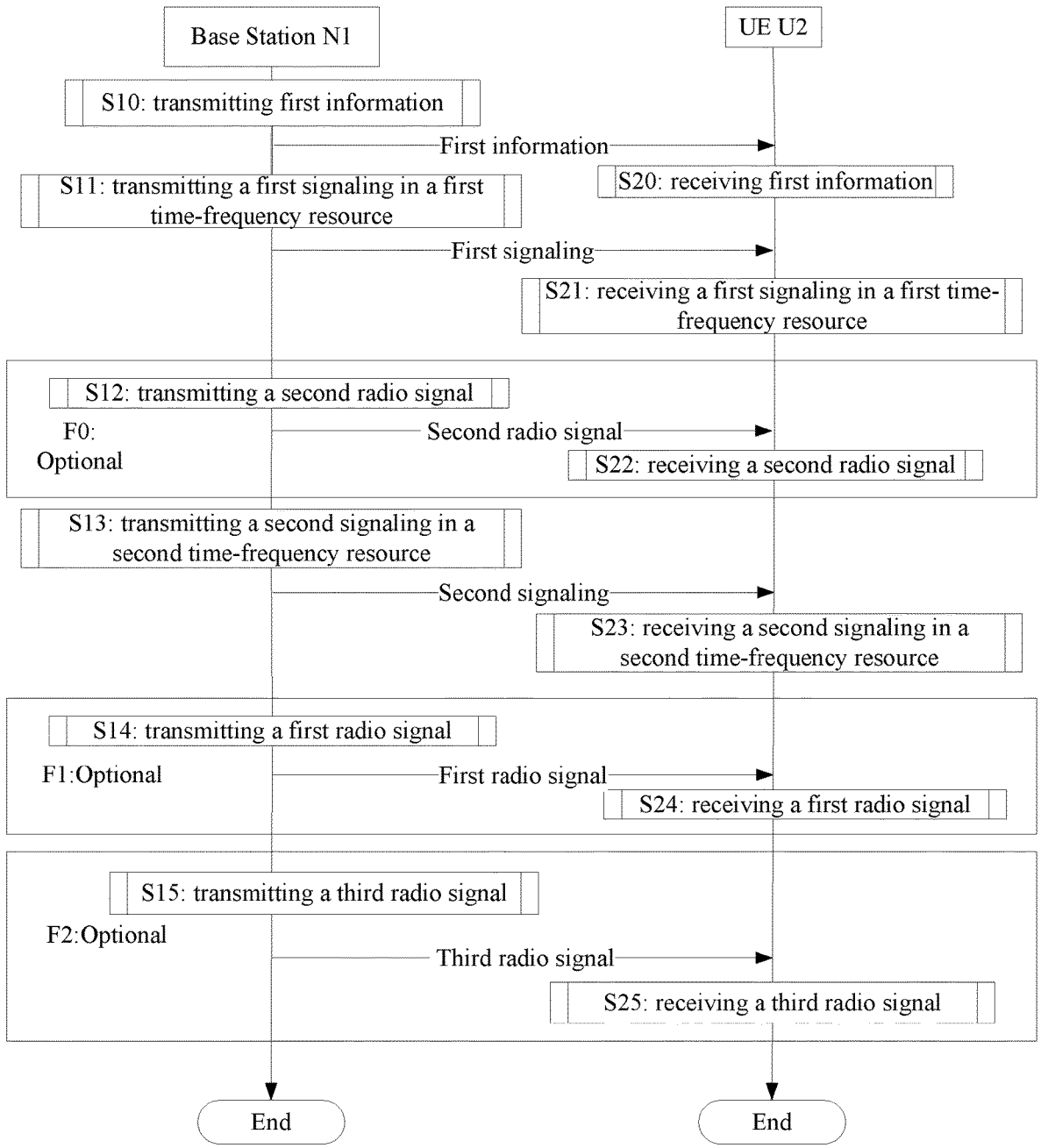
FIG. 5 is a flowchart of a first radio signal according to one embodiment of the disclosure.

Embodiment 5 illustrates an example of a flowchart of a first radio signal, as shown in FIG. 5. In FIG. 5, a base station N1 is a maintenance base station for a serving cell of a UE U2; steps in box F0, box F1 and box F2 are optional.

The base station N1 transmits first information in S10, transmits a first signaling in a first time-frequency resource in S11, transmits a second radio signal in S12, transmits a second signaling in a second time-frequency resource in S13, transmits a first radio signal in S14, and transmits a third radio signal in S15.

The UE U2 receives first information in S20, receives a first signaling in a first time-frequency resource in S21, receives a second radio signal in S22, receives a second signaling in a second time-frequency resource in S23, receives a first radio signal in S24, and receives a third radio signal in S25.

In Embodiment 5, the first signaling is an SPS signaling, and the first time-frequency resource is located before the second time-frequency resource in time domain; the first signaling includes first configuration information, the first configuration information is applicable to the first radio signal, and the first configuration information includes at least one of occupied frequency-domain resources, an MCS or a HARQ process number; the second signaling is used for determining a first multiantenna related parameter, and the first multiantenna related parameter is applicable to the first radio signal; time-domain resources occupied by the second radio signal are located before time-domain resources occupied by the second time-frequency resource, the first configuration information is applicable to the second radio signal, and the second radio signal is unrelated to the first multiantenna related parameter; the second signaling includes second configuration information, and the second configuration information includes at least one of occupied frequency domain resources, an MCS or a HARQ process number; and the second configuration information is applicable to the third radio signal; the first information is used for determining a target time unit set, and the target time unit set includes T time units, the T being a positive integer greater than 1; the UE U2 receives the first radio signal in a first time unit, and the first time unit belongs to the target time unit set.

In one subembodiment, the first signaling is downlink control information for downlink grant.

In one subembodiment, the second radio signal is generated by a second bit block, and the second bit block belongs to the SPS data scheduled by the first signaling.

In one subembodiment, the second radio signal and the first radio signal belong to a second time unit and a first time unit respectively, and the first time unit is orthogonal to the second time unit in time domain.

In one affiliated embodiment of the above subembodiment, the first time unit and the second time unit correspond to different slots respectively.

In one affiliated embodiment of the above subembodiment, the first time unit and the second time unit correspond to different subframes respectively.

In one subembodiment, the third radio signal is unrelated to the first configuration information.

In one subembodiment, the second signaling is a given DCI, and a Cyclic Redundancy Check (CRC) included in the given DCI is scrambled with a UE specific RNTI.

In one subembodiment, the second signaling is a given DCI, and a CRC included in the given DCI is scrambled with a C-RNTI.

In one subembodiment, the second signaling is a dynamic scheduling signaling, and the third radio signal is a dynamic data transmission scheduled by the dynamic scheduling signaling.

In one subembodiment, the UE U2 receives the first radio signal and the third radio signal in a given time unit respectively.

In one affiliated embodiment of the above subembodiment, the given time unit is one slot, or the given time unit is one subframe In one affiliated embodiment of the above subembodiment, the UE U2 receives the first radio signal and the third radio signal employing a same receiving beamforming vector respectively.

In one example of the above affiliated embodiment, the beamforming vector includes at least one of an analog beamforming vector or a digital beamforming vector.

In one subembodiment, the first signaling and the second signaling are one DCI respectively.

In one subembodiment, the second signaling is downlink control information for downlink grant.

In one subembodiment, the first information is an RRC signaling.

In one subembodiment, the T time units correspond to T slots respectively.

In one subembodiment, the T time units correspond to T subframes respectively.

In one subembodiment, any two adjacent time units among the T time units have an interval of T1 ms in time domain.

In one affiliated embodiment of the above subembodiment, the first information indicates the T1.

In one affiliated embodiment of the above subembodiment, the T1 is a positive integer.

In one subembodiment, the first information includes an SPS-ConfigDL Information Element (IE) in TS 38.331.

In one subembodiment, a transport channel corresponding to the third radio signal is a DL-SCH.

Embodiment 6

Figure 6:
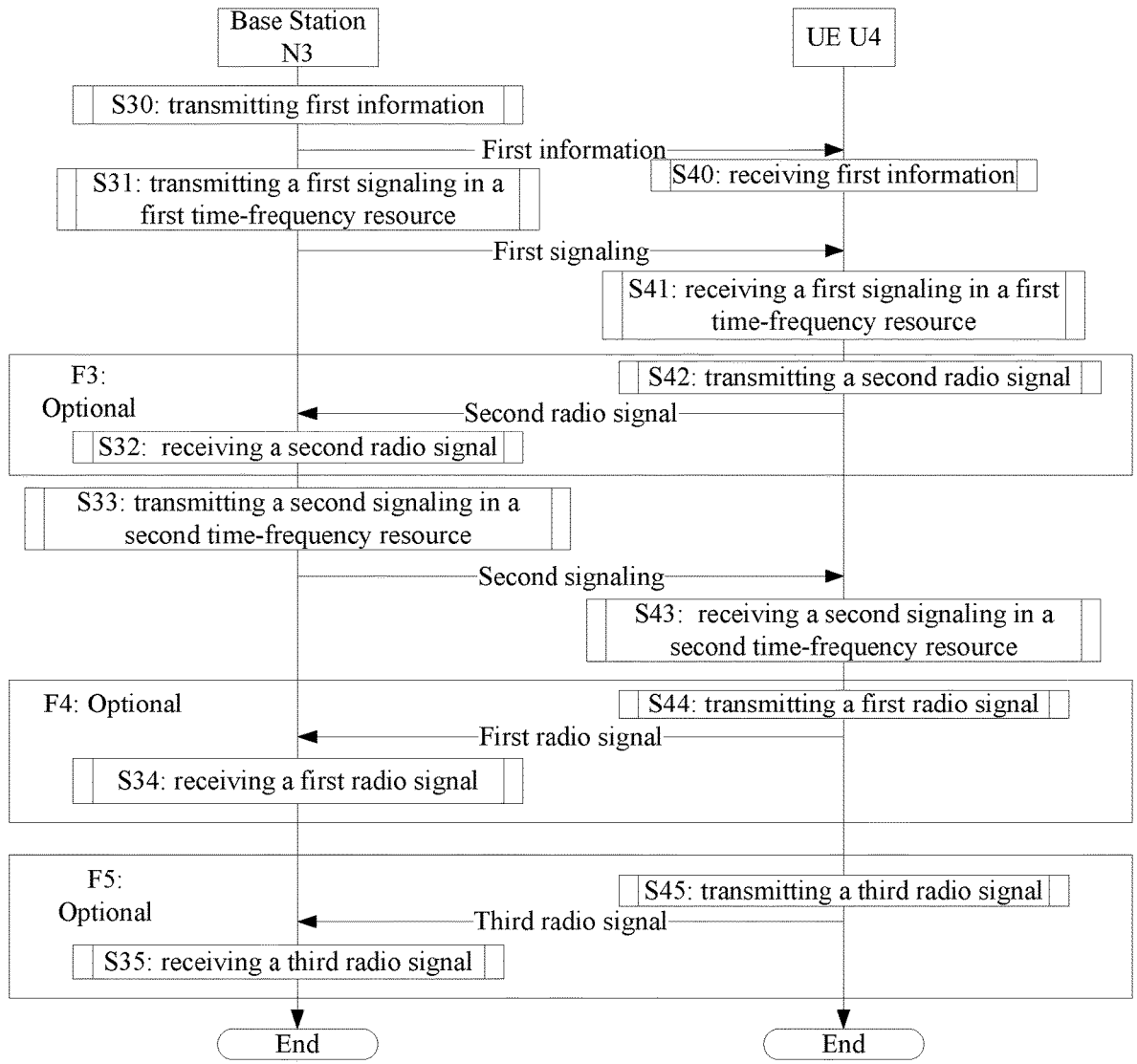
FIG. 6 is a flowchart of a first radio signal according to another embodiment of the disclosure.

Embodiment 6 illustrates an example of another flowchart of a first radio signal, as shown in FIG. 6. In FIG. 6, a base station N3 is a maintenance base station for a serving cell of a UE U4; steps in box F3, box F4 and box F5 are optional.

The base station N3 transmits first information in S30, transmits a first signaling in a first time-frequency resource in S31, receives a second radio signal in S32, transmits a second signaling in a second time-frequency resource in S33, receives a first radio signal in S34, and receives a third radio signal in S35.

The UE U4 receives first information in S40, receives a first signaling in a first time-frequency resource in S41, transmits a second radio signal in S42, receives a second signaling in a second time-frequency resource in S43, transmits a first radio signal in S44, and transmits a third radio signal in S45.

In Embodiment 6, the first signaling is an SPS signaling, and the first time-frequency resource is located before the second time-frequency resource in time domain; the first signaling includes first configuration information, the first configuration information is applicable to the first radio signal, and the first configuration information includes at least one of occupied frequency-domain resources, an MCS or a HARQ process number; the second signaling is used for determining a first multiantenna related parameter, and the first multiantenna related parameter is applicable to the first radio signal; time-domain resources occupied by the second radio signal are located before time-domain resources occupied by the second time-frequency resource, the first configuration information is applicable to the second radio signal, and the second radio signal is unrelated to the first multiantenna related parameter; the second signaling includes second configuration information, and the second configuration information includes at least one of occupied frequency domain resources, an MCS or a HARQ process number; and the second configuration information is applicable to the third radio signal; the first information is used for determining a target time unit set, and the target time unit set includes T time units, the T being a positive integer greater than 1; the UE U4 transmits the first radio signal in a first time unit, and the first time unit belongs to the target time unit set.

In one subembodiment, the first signaling is downlink control information for uplink grant.

In one subembodiment, the second signaling is an uplink grant.

In one subembodiment, the second radio signal is generated by a second bit block, and the second bit block belongs to the SPS data scheduled by the first signaling.

In one subembodiment, the second radio signal and the first radio signal belong to a second time unit and a first time unit respectively, and the first time unit is orthogonal to the second time unit in time domain.

In one affiliated embodiment of the above subembodiment, the first time unit and the second time unit correspond to different slots respectively.

In one affiliated embodiment of the above subembodiment, the first time unit and the second time unit correspond to different subframes respectively.

In one subembodiment, the third radio signal is unrelated to the first configuration information.

In one subembodiment, the second signaling is a given DCI, and a CRC included in the given DCI is scrambled with a UE specific RNTI.

In one subembodiment, the second signaling is a given DCI, and a CRC included in the given DCI is scrambled with a C-RNTI.

In one subembodiment, the second signaling is a dynamic scheduling signaling, and the third radio signal is a dynamic data transmission scheduled by the dynamic scheduling signaling.

In one subembodiment, the UE U4 transmits the first radio signal and the third radio signal in a given time unit respectively.

In one affiliated embodiment of the above subembodiment, the given time unit is one slot, or the given time unit is one subframe In one affiliated embodiment of the above subembodiment, the UE U4 transmits the first radio signal and the third radio signal employing a same antenna port respectively.

In one affiliated embodiment of the above subembodiment, the UE U4 transmits the first radio signal and the third radio signal employing a same antenna port group respectively.

In one subembodiment, S32 and S42 illustrated in Embodiment 6 can replace S12 and S22 illustrated in Embodiment 5 respectively.

In one subembodiment, S34 and S44 illustrated in Embodiment 6 can replace S14 and S24 illustrated in Embodiment 5 respectively.

In one subembodiment, S35 and S45 illustrated in Embodiment 6 can replace S15 and S25 illustrated in Embodiment 5 respectively.

In one subembodiment, the first information includes an SPS-ConfigUL IE in TS 38.331.

In one subembodiment, a transport channel corresponding to the third radio signal is an UL-SCH.

Embodiment 7

Figure 7:
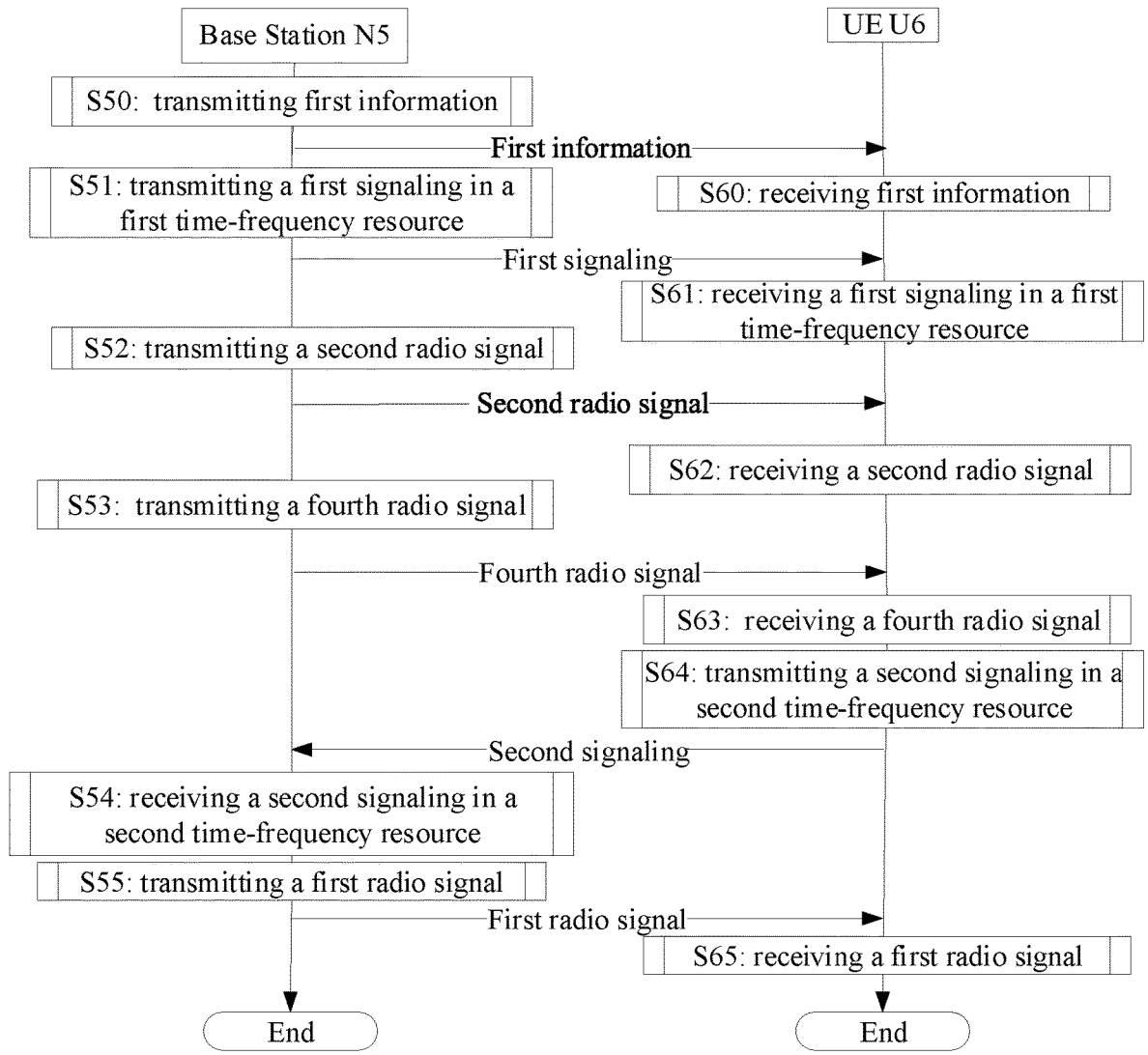
FIG. 7 is a flowchart of a fourth radio signal according to one embodiment of the disclosure.

Embodiment 7 illustrates an example of a flowchart of a fourth radio signal, as shown in FIG. 7. In FIG. 7, a base station N5 is a maintenance base station for a serving cell of a UE U6.

The base station N5 transmits first information in S50, transmits a first signaling in a first time-frequency resource in S51, transmits a second radio signal in S52, transmits a fourth radio signal in S53, receives a second signaling in a second time-frequency resource in S54, and transmits a first radio signal in S55.

The UE U6 receives first information in S60, receives a first signaling in a first time-frequency resource in S61, receives a second radio signal in S62, receives a fourth radio signal in S63, transmits a second signaling in a second time-frequency resource in S64, and receives a first radio signal in S65.

In Embodiment 7, the first signaling is an SPS signaling, and the first time-frequency resource is located before the second time-frequency resource in time domain; the first signaling includes first configuration information, the first configuration information is applicable to the first radio signal, and the first configuration information includes at least one of occupied frequency-domain resources, an MCS or a HARQ process number; the second signaling is used for determining a first multiantenna related parameter, and the first multiantenna related parameter is applicable to the first radio signal; time-domain resources occupied by the second radio signal are located before time-domain resources occupied by the second time-frequency resource, the first configuration information is applicable to the second radio signal, and the second radio signal is unrelated to the first multiantenna related parameter; a measurement for the fourth radio signal is used for triggering the transmitting of the second signaling; the first information is used for determining a target time unit set, and the target time unit set includes T time units, the T being a positive integer greater than 1; the UE U6 receives the first radio signal in a first time unit, and the first time unit belongs to the target time unit set.

In one subembodiment, the first signaling is downlink control information for downlink grant.

In one subembodiment, the second radio signal is generated by a second bit block, and the second bit block belongs to the SPS data scheduled by the first signaling.

In one subembodiment, the second radio signal and the first radio signal belong to a second time unit and a first time unit respectively, and the first time unit is orthogonal to the second time unit in time domain.

In one affiliated embodiment of the above subembodiment, the first time unit and the second time unit correspond to different slots respectively.

In one affiliated embodiment of the above subembodiment, the first time unit and the second time unit correspond to different subframes respectively.

In one subembodiment, the first signaling and the second signaling are one DCI and one UCI respectively.

In one subembodiment, the second signaling is transmitted on a Physical Uplink Control Channel (PUCCH).

In one subembodiment, the second signaling is transmitted on a Physical Random Access Channel (PRACH).

In one subembodiment, the second signaling is a Beam Recovery Request (BRR).

In one subembodiment, the fourth radio signal includes at least one of a Synchronization Signal (SS) block, a Channel Status Information Reference Signal (CSI-RS) or a Demodulation Reference Signal (DMRS).

In one subembodiment, the measurement for the fourth radio signal indicates that a Block Error Rate (BLER) of a target channel is lower than a specific threshold.

In one affiliated embodiment of the above subembodiment, the target channel is a Physical Downlink Control Channel (PDCCH).

In one affiliated embodiment of the above subembodiment, the specific threshold is configurable.

In one affiliated embodiment of the above subembodiment, an antenna port used for transmitting the target channel is Quasi Co-Located (QCLed) with an antenna port used for transmitting the fourth radio signal.

In one affiliated embodiment of the above subembodiment, the target channel is a hypothetical PDCCH.

In one subembodiment, multiple times of measurements for the fourth radio signal indicate that BLERs of a target channel are all lower than a specific threshold, and the UE U6 transmits the second signaling.

In one subembodiment, the first information is an RRC signaling.

In one subembodiment, the T time units correspond to T slots respectively.

In one subembodiment, the T time units correspond to T subframes respectively.

In one subembodiment, any two adjacent time units among the T time units have an interval of T1 ms in time domain.

In one affiliated embodiment of the above subembodiment, the first information indicates the T1.

In one affiliated embodiment of the above subembodiment, the T1 is a positive integer.

In one subembodiment, the first information includes an SPS-ConfigDL IE in TS 38.331.

In one subembodiment, the second time-frequency resource is configured through a higher layer signaling.

Embodiment 8

Figure 8:
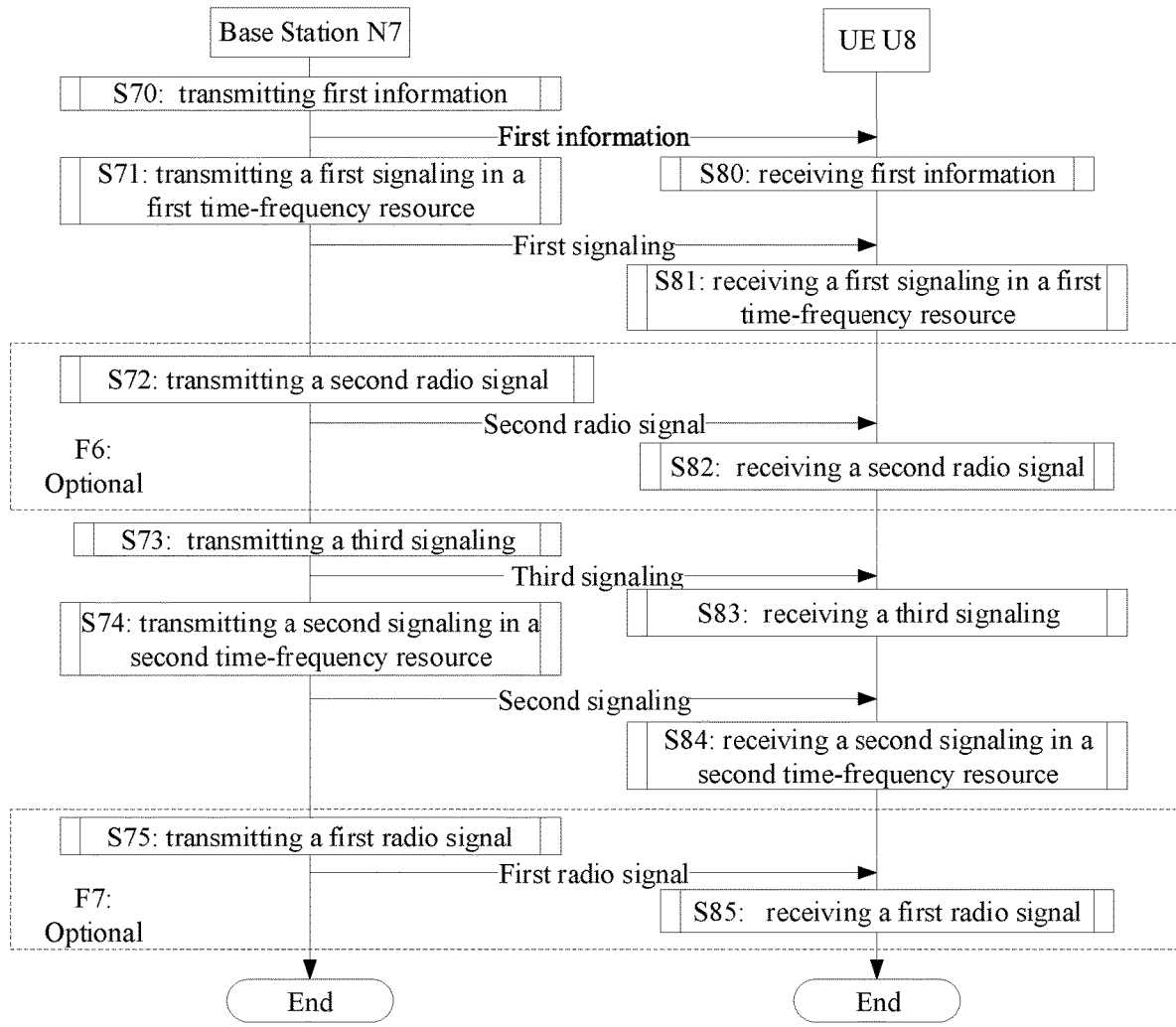
FIG. 8 is a flowchart of a third signaling according to one embodiment of the disclosure.

Embodiment 8 illustrates an example of a flowchart of a third signaling, as shown in FIG. 8. In FIG. 8, a base station N7 is a maintenance base station for a serving cell of a UE U8. Steps in box F6 and box F7 are optional.

The base station N7 transmits first information in S70, transmits a first signaling in a first time-frequency resource in S71, transmits a second radio signal in S72, transmits a third signaling in S73, transmits a second signaling in a second time-frequency resource in S74, and transmits a first radio signal in S75.

The UE U8 receives first information in S80, receives a first signaling in a first time-frequency resource in S81, receives a second radio signal in S82, receives a third signaling in S83, receives a second signaling in a second time-frequency resource in S84, and receives a first radio signal in S85.

In Embodiment 8, the first signaling is an SPS signaling, and the first time-frequency resource is located before the second time-frequency resource in time domain; the first signaling includes first configuration information, the first configuration information is applicable to the first radio signal, and the first configuration information includes at least one of occupied frequency-domain resources, an MCS or a HARQ process number; the second signaling is used for determining a first multiantenna related parameter, and the first multiantenna related parameter is applicable to the first radio signal; time-domain resources occupied by the second radio signal are located before time-domain resources occupied by the second time-frequency resource, the first configuration information is applicable to the second radio signal, and the second radio signal is unrelated to the first multiantenna related parameter; the second signaling includes Q fields, the Q being a positive integer greater than 1, only a first field among the Q fields is used for the UE U8, the first field is one of the Q fields, and the third signaling is used for determining the first field from the Q fields; the first information is used for determining a target time unit set, and the target time unit set includes T time units, the T being a positive integer greater than 1; the UE U8 receives the first radio signal in a first time unit, and the first time unit belongs to the target time unit set.

In one subembodiment, the first signaling is downlink control information for downlink grant.

In one subembodiment, the second radio signal is generated by a second bit block, and the second bit block belongs to the SPS data scheduled by the first signaling.

In one subembodiment, the second radio signal and the first radio signal belong to a second time unit and a first time unit respectively, and the first time unit is orthogonal to the second time unit in time domain.

In one affiliated embodiment of the above subembodiment, the first time unit and the second time unit correspond to different slots respectively.

In one affiliated embodiment of the above subembodiment, the first time unit and the second time unit correspond to different subframes respectively.

In one subembodiment, the second signaling is a cell specific.

In one subembodiment, the second signaling is a terminal group specific.

In one subembodiment, a CRC included in the second signaling is scrambled with a terminal group specific RNTI.

In one subembodiment, the second signaling includes Q fields, the Q being a positive integer greater than 1, and only one field among the Q fields is used for the UE U8.

In one subembodiment, the Q fields in the second signaling correspond to Q terminals respectively, and the UE U8 is one of the Q terminals.

In one subembodiment, the second signaling is not used for triggering a transmitting or receiving of a radio signal.

In one subembodiment, the second signaling does not include a Resource Allocation (RA) field.

In one subembodiment, the second signaling does not include an MCS field.

In one subembodiment, the third signaling indicates a position of the first field in the Q fields.

In one subembodiment, the third signaling indicates Q indexes arranged in sequence, the Q indexes arranged in sequence indicate Q terminals respectively, and a position of an index corresponding to the UE U8 in the Q indexes arranged in sequence corresponds to a position of the first field in the Q fields.

In one subembodiment, the third signaling is one RRC signaling.

In one subembodiment, the first information is an RRC signaling.

In one subembodiment, the T time units correspond to T slots respectively.

In one subembodiment, the T time units correspond to T subframes respectively.

In one subembodiment, any two adjacent time units among the T time units have an interval of T1 ms in time domain.

In one affiliated embodiment of the above subembodiment, the first information indicates the T1.

In one affiliated embodiment of the above subembodiment, the T1 is a positive integer.

In one subembodiment, the first information includes an SPS-ConfigDL IE in TS 38.331.

In one subembodiment, the first information includes the third signaling.

Embodiment 9

Figure 9:
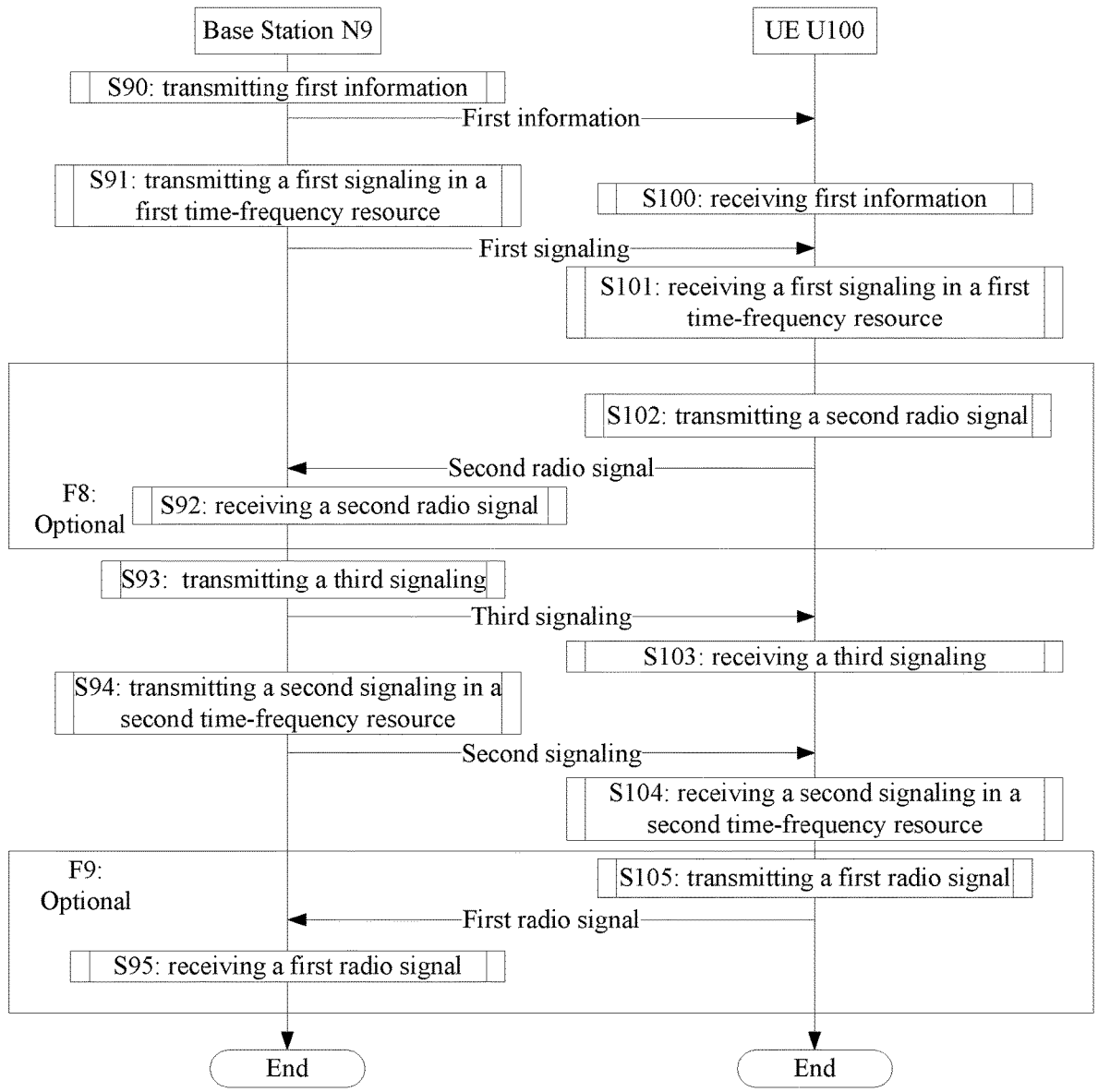
FIG. 9 is a flowchart of a third signaling according to another embodiment of the disclosure.

Embodiment 9 illustrates an example of another flowchart of a third signaling, as shown in FIG. 9. In FIG. 9, a base station N9 is a maintenance base station for a serving cell of a UE U10. Steps in box F8 and box F9 are optional.

The base station N9 transmits first information in S90, transmits a first signaling in a first time-frequency resource in S91, receives a second radio signal in S92, transmits a third signaling in S93, transmits a second signaling in a second time-frequency resource in S94, and receives a first radio signal in S95.

The UE U10 receives first information in S100, receives a first signaling in a first time-frequency resource in S101, transmits a second radio signal in S102, receives a third signaling in S103, receives a second signaling in a second time-frequency resource in S104, and transmits a first radio signal in S105.

In Embodiment 9, the first signaling is an SPS signaling, and the first time-frequency resource is located before the second time-frequency resource in time domain; the first signaling includes first configuration information, the first configuration information is applicable to the first radio signal, and the first configuration information includes at least one of occupied frequency-domain resources, an MCS or a HARQ process number; the second signaling is used for determining a first multiantenna related parameter, and the first multiantenna related parameter is applicable to the first radio signal; time-domain resources occupied by the second radio signal are located before time-domain resources occupied by the second time-frequency resource, the first configuration information is applicable to the second radio signal, and the second radio signal is unrelated to the first multiantenna related parameter; the second signaling includes Q fields, the Q being a positive integer greater than 1, only a first field among the Q fields is used for the UE U10, the first field is one of the Q fields, and the third signaling is used for determining the first field from the Q fields; the first information is used for determining a target time unit set, and the target time unit set includes T time units, the T being a positive integer greater than 1; the UE U10 transmits the first radio signal in a first time unit, and the first time unit belongs to the target time unit set.

In one subembodiment, the first signaling is downlink control information for uplink grant.

In one subembodiment, the first information includes an SPS-ConfigUL IE in TS 38.331.

In one subembodiment, S92 and S102 illustrated in Embodiment 9 can replace S72 and S82 illustrated in Embodiment 8 respectively.

In one subembodiment, S95 and S105 illustrated in Embodiment 9 can replace S75 and S85 illustrated in Embodiment 8 respectively.

In one subembodiment, the first information includes the third signaling.

Embodiment 10

Figure 10:
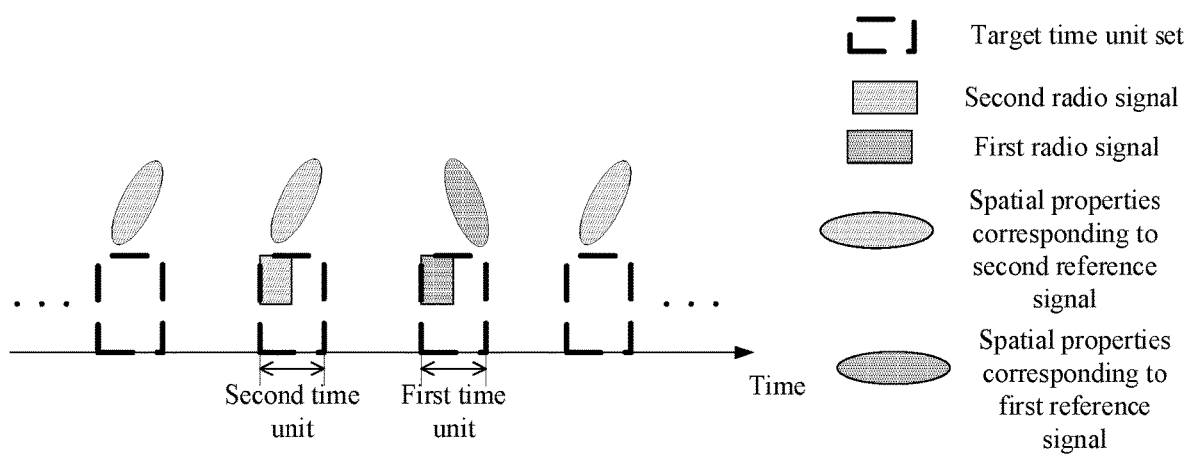
FIG. 10 is a diagram illustrating a first radio signal and a second radio signal according to one embodiment of the disclosure.

Embodiment 10 illustrates an example of a diagram of a first radio signal and a second radio signal, as shown in FIG. 10. In FIG. 10, the first radio signal is transmitted in a first time unit, the second radio signal is transmitted in a second time unit, and both the first time unit and the second time unit belong to a target time unit set; the target time unit set includes a positive integer number of time units; the first radio signal corresponds to a first reference signal, and the second radio signal corresponds to a second reference signal; and spatial properties of the first reference signal are different from spatial properties of the second reference signal.

In one subembodiment, the first time unit corresponds to a first slot, the second time unit corresponds to a second slot, and the first slot is orthogonal to the second slot in time domain.

In one subembodiment, the first time unit corresponds to a first subframe, the second time unit corresponds to a second subframe, and the first subframe is orthogonal to the second subframe in time domain.

In one subembodiment, the positive integer number of time units correspond to a positive integer number of subframes, or the positive integer number of time units correspond to a positive integer number of slots.

In one subembodiment, the first radio signal and the first reference signal are transmitted employing a same transmitting antenna port, or the first radio signal and the first reference signal are transmitted employing a same transmitting antenna port group.

In one subembodiment, the second radio signal and the second reference signal are transmitted employing a same transmitting antenna port, or the second radio signal and the second reference signal are transmitted employing a same transmitting antenna port group.

In one subembodiment, the first radio signal and the first reference signal employ a same receiving beamforming vector.

In one subembodiment, the phrase that spatial properties of the first reference signal are different from spatial properties of the second reference signal refers that: an antenna port transmitting the first reference signal is different from an antenna port transmitting the second reference signal.

In one subembodiment, the phrase that spatial properties of the first reference signal are different from spatial properties of the second reference signal refers that: an antenna port group transmitting the first reference signal is different from an antenna port group transmitting the second reference signal.

In one subembodiment, the phrase that spatial properties of the first reference signal are different from spatial properties of the second reference signal refers that: a beamforming vector receiving the first reference signal is different from a beamforming vector receiving the second reference signal.

In one subembodiment, the phrase that spatial properties of the first reference signal are different from spatial properties of the second reference signal refers that: the first reference signal corresponds to a first beam, the second reference signal corresponds to a second beam, and the first beam is different from the second beam.

In one subembodiment, the second signaling in the disclosure configures the first reference signal.

In one subembodiment, the first signaling in the disclosure configures the second reference signal.

In one subembodiment, the first multiantenna related parameter in the disclosure is used for determining the first reference signal.

In one subembodiment, the first information in the disclosure is used for determining the target time unit set.

Embodiment 11

Figure 11:
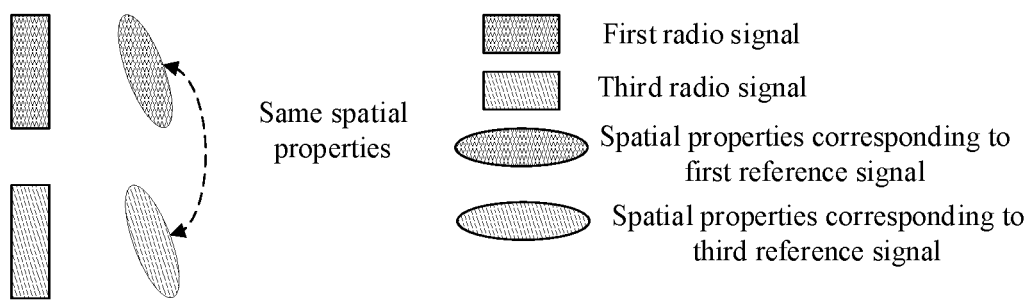
FIG. 11 is a diagram illustrating a first radio signal and a third radio signal according to one embodiment of the disclosure.

Embodiment 11 illustrates an example of a diagram of a first radio signal and a third radio signal, as shown in FIG. 11. In FIG. 11, the first radio signal corresponds to a first reference signal, the third radio signal corresponds to a third reference signal, the first reference signal and the third reference signal correspond to same spatial properties.

In one subembodiment, the first radio signal and the third radio signal are transmitted in one same slot, or the first radio signal and the third radio signal are transmitted in one same subframe.

In one affiliated embodiment of the above subembodiment, the first radio signal and the third radio signal occupy different frequency domain resources.

In one affiliated embodiment of the above subembodiment, frequency domain resources occupied by the first radio signal are orthogonal to frequency domain resources occupied by the third radio signal.

In one subembodiment the phrase that the first reference signal and the third reference signal correspond to same spatial properties refers that: a transmitting antenna port for the first reference signal is the same as a transmitting antenna port for the second reference signal.

In one subembodiment the phrase that the first reference signal and the third reference signal correspond to same spatial properties refers that: the first reference signal and the second reference signal are QCLed.

In one affiliated embodiment of the above subembodiment, the phrase that the first reference signal and the second reference signal are QCLed refers that: the first reference signal and the second reference signal are same in at least one of Doppler shift, transmission latency or spatial receiving parameters.

In one subembodiment, the phrase that the first reference signal and the third reference signal correspond to same spatial properties refers that: a transmitting antenna port group for the first reference signal is the same as a transmitting antenna port group for the second reference signal.

In one subembodiment, the phrase that the first reference signal and the third reference signal correspond to same spatial properties refers that: a receiving beamforming vector for the first reference signal is the same as a receiving beamforming vector for the second reference signal.

In one subembodiment, the phrase that the first reference signal and the third reference signal correspond to same spatial properties refers that: the first reference signal corresponds to a first beam, the third reference signal corresponds to a third beam, and the first beam is the same as the third beam.

In one subembodiment, the first signaling in the disclosure configures the first reference signal.

In one subembodiment, the first multiantenna related parameter in the disclosure is used for determining the first reference signal.

Embodiment 12

Figure 12:
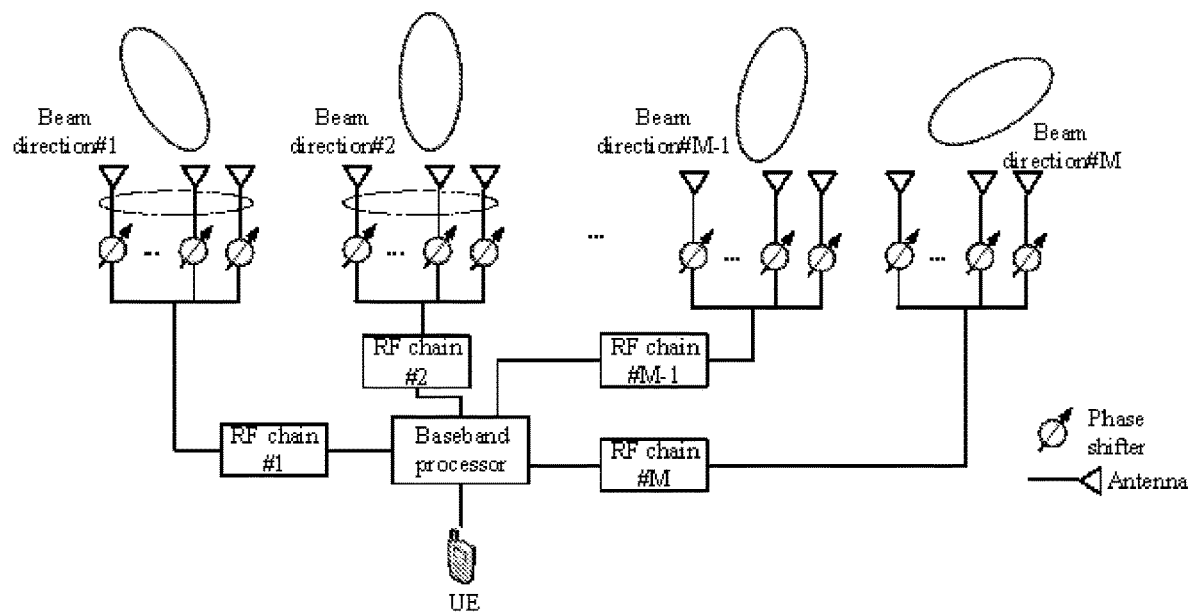
FIG. 12 is a diagram illustrating an antenna structure equipped on a UE according to one embodiment of the disclosure.

Embodiment 12 illustrates an example of a diagram of an antenna structure equipped on a UE, as shown in FIG. 12. In FIG. 12, the UE is equipped with M Radio Frequency (RF) chains, which are an RF chain #1, an RF chain #2, . . . , an RF chain #M respectively. The M RF chains are connected to one baseband processor.

In one subembodiment, any one of the M RF chains supports a bandwidth not larger than a bandwidth of a frequency subband configured for the UE.

In one subembodiment, M1 RF chains among the M RF chains generate one antenna port through antenna virtualization superposition, the M1 RF chains are connected to M1 antenna groups respectively, and each of the M1 antenna groups includes a positive integer number of antennas. One antenna group is connected to a baseband processor through one RF chain, and different antenna groups correspond to different RF chains. Mapping coefficients from antennas included in any one of the M1 antenna groups to the antenna port constitute an analog beamforming vector of the antenna group. Analog beamforming vectors corresponding to the M1 antenna groups are diagonally arranged to form an analog beamforming matrix of the antenna port. Mapping coefficients from the M1 antenna groups to the antenna port constitute a digital beamforming vector corresponding to the antenna port.

In one subembodiment, the M1 RF chains belong to one same panel.

In one subembodiment, the M1 RF chains are QCLed.

In one subembodiment, M2 RF chains among the M RF chains generate one receiving beam through antenna virtualization superposition, the M2 RF chains are connected to M2 antenna groups respectively, and each of the M2 antenna groups includes a positive integer number of antennas. One antenna group is connected to a baseband processor through one RF chain, and different antenna groups correspond to different RF chains. Mapping coefficients from antennas included in any one of the M2 antenna groups to the receiving beam constitute an analog beamforming vector of the receiving beam. Analog beamforming vectors corresponding to the M2 antenna groups are diagonally arranged to form an analog beamforming matrix of the receiving beam. Mapping coefficients from the M2 antenna groups to the receiving beam constitute a digital beamforming vector corresponding to the receiving beam.

In one subembodiment, the M2 RF chains belong to one same panel.

In one subembodiment, the M2 RF chains are QCLed.

In one subembodiment, the directions of analog beams formed by the M RF chains are a beam direction #1, a beam direction #2, a beam direction #M−1 and a beam direction #M as shown in FIG. 12 respectively.

In one subembodiment, a layer and an antenna port are in one-to-one correspondence.

In one subembodiment, one layer is mapped to multiple antenna ports.

In one subembodiment, the M is an even number, an RF chain #1, an RF chain #2, ..., an RF chain #M/2 among the M RF chains are connected to a first panel, and an RF chain #M/2+1, an RF chain #M/2+2, ..., an RF chain #M among the M RF chains are connected to a second panel.

In one subembodiment, the first panel and the second panel employ different crystal oscillators respectively.

Embodiment 13

Figure 13:
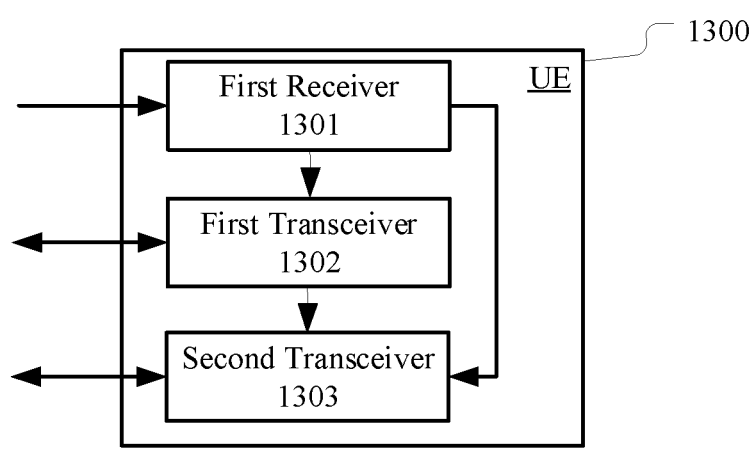
FIG. 13 is a structure block diagram illustrating a processing device in a UE according to one embodiment of the disclosure.

Embodiment 13 illustrates an example of a structure block diagram of a processing device in a UE, as shown in FIG. 13. In FIG. 13, the processing device 1300 in the UE mainly includes a first receiver 1301, a first transceiver 1302 and a second transceiver 1303.

The first receiver 1301 receives a first signaling in a first time-frequency resource.

The first transceiver 1302 receives a second signaling in a second time-frequency resource, or transmits a second signaling in a second time-frequency resource.

The second transceiver 1303 operates a first radio signal.

In Embodiment 13, the first signaling is an SPS signaling, and the first time-frequency resource is located before the second time-frequency resource in time domain; the first signaling includes first configuration information, the first configuration information is applicable to the first radio signal, and the first configuration information includes at least one of occupied frequency-domain resources, an MCS or a HARQ process number; the operate is receive, or, the operate is transmit; the second signaling is used for determining a first multiantenna related parameter, and the first multiantenna related parameter is applicable to the first radio signal.

In one subembodiment, the first transceiver 1302 further operates a second radio signal; time-domain resources occupied by the second radio signal are located before time-domain resources occupied by the second time-frequency resource, the first configuration information is applicable to the second radio signal, and the second radio signal is unrelated to the first multiantenna related parameter; the operate is receive, or, the operate is transmit.

In one subembodiment, the first transceiver 1302 further operates a third radio signal; the UE receives the second signaling, the second signaling includes second configuration information, and the second configuration information includes at least one of occupied frequency domain resources, an MCS or a HARQ process number; and the second configuration information is applicable to the third radio signal; the operate is receive, or, the operate is transmit.

In one subembodiment, the first transceiver 1302 further receives a fourth radio signal; the UE transmits the second signaling, and a measurement for the fourth radio signal is used for triggering the transmitting of the second signaling.

In one subembodiment, the first receiver 1301 further receives a third signaling; the second signaling includes Q fields, the Q being a positive integer greater than 1, only a first field among the Q fields is used for the UE, the first field is one of the Q fields, and the third signaling is used for determining the first field from the Q fields.

In one subembodiment, the first receiver 1301 further receives first information; the first information is used for determining a target time unit set, and the target time unit set includes T time units, the T being a positive integer greater than 1; the UE operates the first radio signal in a first time unit, and the first time unit belongs to the target time unit set; the operate is receive, or, the operate is transmit.

In one subembodiment, the first signaling is downlink control information for downlink grant, and the operate is receive; or, the first signaling is downlink control information for uplink grant, and the operate is transmit.

In one subembodiment, the first receiver 1301 includes at least the former two of the receiver 456, the receiving processor 452 or the controller/processor 490 illustrated in Embodiment 4.

In one subembodiment, the first transceiver 1302 includes the receiver/transmitter 456, the receiving processor 452, the transmitting processor 455 or the controller/processor 490 illustrated in Embodiment 4.

In one subembodiment, the second transceiver 1303 includes at least the former three of the receiver/transmitter 456, the receiving processor 452, the transmitting processor 455 or the controller/processor 490 illustrated in Embodiment 4.

Embodiment 14

Figure 14:
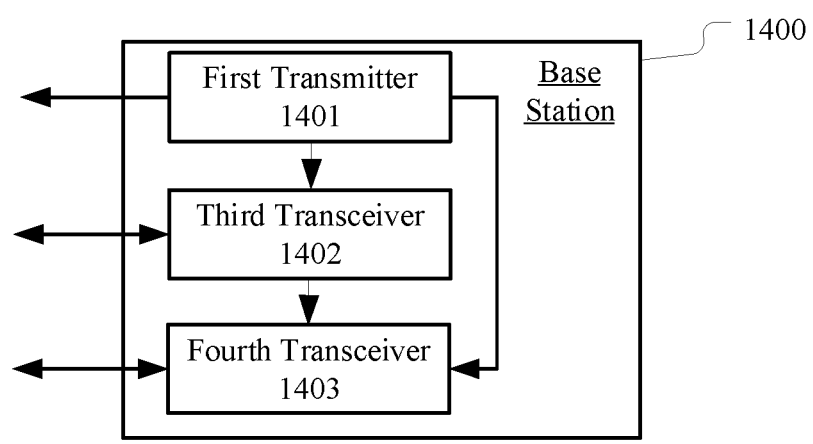
FIG. 14 is a structure block diagram illustrating a processing device in a base station according to one embodiment of the disclosure.

Embodiment 14 illustrates an example of a structure block diagram of a processing device in a base station, as shown in FIG. 14. In FIG. 14, the processing device 1400 in the base station mainly includes a first transmitter 1401, a third transceiver 1402 and a fourth transceiver 1403.

The first transmitter 1401 transmits a first signaling in a first time-frequency resource.

The third transceiver 1402 transmits a second signaling in a second time-frequency resource, or receives a second signaling in a second time-frequency resource.

The fourth transceiver 1403 executes a first radio signal.

In Embodiment 14, the first signaling is an SPS signaling, and the first time-frequency resource is located before the second time-frequency resource in time domain; the first signaling includes first configuration information, the first configuration information is applicable to the first radio signal, and the first configuration information includes at least one of occupied frequency-domain resources, an MCS or a HARQ process number; the execute is transmit, or, the execute is receive; the second signaling is used for determining a first multiantenna related parameter, and the first multiantenna related parameter is applicable to the first radio signal; and a receiver of the first signaling includes a first terminal.

In one subembodiment, the third transceiver 1402 further executes a second radio signal; time-domain resources occupied by the second radio signal are located before time-domain resources occupied by the second time-frequency resource, the first configuration information is applicable to the second radio signal, and the second radio signal is unrelated to the first multiantenna related parameter; the execute is transmit, or, the execute is receive.

In one subembodiment, the third transceiver 1402 further executes a third radio signal; the first terminal receives the second signaling, the second signaling includes second configuration information, and the second configuration information includes at least one of occupied frequency domain resources, an MCS or a HARQ process number; and the second configuration information is applicable to the third radio signal; the execute is transmit, or, the execute is receive.

In one subembodiment, the third transceiver 1402 further transmits a fourth radio signal; the first terminal transmits the second signaling, and a measurement for the fourth radio signal is used for triggering the transmitting of the second signaling.

In one subembodiment, the first transmitter 1401 further transmits a third signaling; the second signaling includes Q fields, the Q being a positive integer greater than 1, only a first field among the Q fields is used for the first terminal, the first field is one of the Q fields, and the third signaling is used for determining the first field from the Q fields.

In one subembodiment, the first transmitter 1401 further transmits first information; the first information is used for determining a target time unit set, and the target time unit set includes T time units, the T being a positive integer greater than 1; the base station executes the first radio signal in a first time unit, and the first time unit belongs to the target time unit set; the execute is transmit, or, the execute is receive.

In one subembodiment, the first signaling is downlink control information for downlink grant, and the execute is transmit; or, the first signaling is downlink control information for uplink grant, and the execute is receive.

In one subembodiment, the first transmitter 1401 includes at least the former two of the transmitter 416, the transmitting processor 415 or the controller/processor 440 illustrated in Embodiment 4.

In one subembodiment, the third transceiver 1402 includes the receiver/transmitter 416, the receiving processor 412, the transmitting processor 415 or the controller/processor 440 illustrated in Embodiment 4.

In one subembodiment, the fourth transceiver 1403 includes at least the former three of the receiver/transmitter 416, the receiving processor 412, the transmitting processor 415 or the controller/processor 440 illustrated in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, etc. The base station in the disclosure includes but not limited to macro-cellular base stations, micro-cellular base stations, home base stations, relay base station, gNB, Transmitter Receiver Point (TRP) and radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for wireless communication, comprising:
receiving a first signaling in a first time-frequency resource;
receiving a second signaling in a second time-frequency resource; and
receiving a first radio signal and a third radio signal;
wherein the first signaling is a Semi-Persistent Scheduling (SPS) signaling, and the first time-frequency resource is located before the second time-frequency resource in time domain; the first signaling comprises first configuration information, the first configuration information is applicable to the first radio signal, and the first configuration information comprises at least one of occupied frequency-domain resources, a Modulation and Coding Status (MCS) and a Hybrid Automatic Repeat Request (HARQ) process number; the first configuration information is used to determine the occupied frequency-domain resources for the first radio signal, the MCS for the first radio signal, and the HARQ process number for the first radio signal; the second signaling is used for determining a first multiantenna related parameter, and the first multiantenna related parameter is applicable to the first radio signal; wherein the second signaling indicates a Transmission Configuration Indicator (TCI), the TCI indicates the first multiantenna related parameter; the second signaling comprises second configuration information, and the second configuration information comprises at least one of occupied frequency domain resources, an MCS or a HARQ process number; and the second configuration information is applicable to the third radio signal, the third radio signal is unrelated to the first configuration information.

2. The method according to claim 1, comprising:
receiving a second radio signal;
wherein time-domain resources occupied by the second radio signal are located before time-domain resources occupied by the second time-frequency resource, the first configuration information is applicable to the second radio signal, and the second radio signal is unrelated to the first multiantenna related parameter.

3. The method according to claim 1, comprising:
receiving a third signaling;
wherein the second signaling comprises Q fields, the Q being a positive integer greater than 1, only a first field among the Q fields is used for the UE, the first field is one of the Q fields, and the third signaling is used for determining the first field from the Q fields.

4. The method according to claim 1, comprising:
receiving first information;
wherein the first information is used for determining a target time unit set, and the target time unit set comprises T time units, the T being a positive integer greater than 1; the UE receives the first radio signal in a first time unit, and the first time unit belongs to the target time unit set.

5. The method according to claim 1, wherein the first signaling is downlink control information for downlink grant.

6. A method in a base station for wireless communication, comprising:
transmitting a first signaling in a first time-frequency resource;
transmitting a third radio signal;
transmitting a second signaling in a second time-frequency resource; and
transmitting a first radio signal;
wherein the first signaling is an SPS signaling, and the first time-frequency resource is located before the second time-frequency resource in time domain; the first signaling comprises first configuration information, the first configuration information is applicable to the first radio signal, and the first configuration information comprises at least one of occupied frequency-domain resources, an MCS and a HARQ process number; the first configuration information is used to determine the occupied frequency-domain resources for the first radio signal, the MCS for the first radio signal, and the HARQ process number for the first radio signal; the second signaling is used for determining a first multi-antenna related parameter, and the first multiantenna related parameter is applicable to the first radio signal; and a receiver of the first signaling comprises a first terminal;
wherein the second signaling indicates a Transmission Configuration Indicator (TCI), the TCI indicates the first multi-antenna related parameter; the second signaling comprises second configuration information, and the second configuration information comprises at least one of occupied frequency domain resources, an MCS or a HARQ process number; and the second configuration information is applicable to the third radio signal, the third radio signal is unrelated to the first configuration information.

7. The method in a base station according to claim 6, comprising:
transmitting a second radio signal;
wherein time-domain resources occupied by the second radio signal are located before time-domain resources occupied by the second time-frequency resource, the first configuration information is applicable to the second radio signal, and the second radio signal is unrelated to the first multiantenna related parameter.

8. The method in a base station according to claim 6, comprising:
transmitting a third signaling;
wherein the second signaling comprises Q fields, the Q being a positive integer greater than 1, only a first field among the Q fields is used for the first terminal, the first field is one of the Q fields, and the third signaling is used for determining the first field from the Q fields.

9. The method according to claim 6, comprising:
transmitting first information;
wherein the first information is used for determining a target time unit set, and the target time unit set comprises T time units, the T being a positive integer greater than 1; the base station transmits the first radio signal in a first time unit, and the first time unit belongs to the target time unit set.

10. The method according to claim 6, wherein the first signaling is downlink control information for downlink grant.

11. A UE for wireless communication, comprising:
a first receiver, to receive a first signaling in a first time-frequency resource;
a first transceiver, to receive a second signaling in a second time-frequency resource and a third radio signal; and
a second transceiver, to receive a first radio signal;
wherein the first signaling is an SPS signaling, and the first time-frequency resource is located before the second time-frequency resource in time domain; the first signaling comprises first configuration information, the first configuration information is applicable to the first radio signal, and the first configuration information comprises at least one occupied frequency-domain resources, an MCS and a HARQ process number; the first configuration information is used to determine the occupied frequency-domain resources for the first radio signal, the MCS for the first radio signal, and the HARQ process number for the first radio signal; the second signaling is used for determining a first multi-antenna related parameter, and the first multiantenna related parameter is applicable to the first radio signal;
wherein the second signaling indicates a Transmission Configuration Indicator (TCI), the TCI indicates the first multiantenna related parameter; the second signaling comprises second configuration information, and the second configuration information comprises at least one of occupied frequency domain resources, an MCS or a HARQ process number; and the second configuration information is applicable to the third radio signal, the third radio signal is unrelated to the first configuration information.

12. The UE according to claim 11, wherein the first transceiver receives a second radio signal; time-domain resources occupied by the second radio signal are located before time-domain resources occupied by the second time-frequency resource, the first configuration information is applicable to the second radio signal, and the second radio signal is unrelated to the first multiantenna related parameter.

13. The UE according to claim 11,
wherein the first receiver receives a third signaling; the second signaling comprises Q fields, the Q being a positive integer greater than 1, only a first field among the Q fields is used for the UE, the first field is one of the Q fields, and the third signaling is used for determining the first field from the Q fields.

14. The UE according to claim 11, wherein the first receiver receives first information; the first information is used for determining a target time unit set, and the target time unit set comprises T time units, the T being a positive integer greater than 1; the UE receives the first radio signal in a first time unit, and the first time unit belongs to the target time unit set.

15. The UE according to claim 11, wherein the first signaling is downlink control information for downlink grant.

16. A base station for wireless communication, comprising:
- a first transmitter, to transmit a first signaling in a first time-frequency resource and a second radio signal;
- a third transceiver, to transmit a second signaling in a second time-frequency resource and a third radio signal; and
- a fourth transceiver, to transmit a first radio signal;
- wherein the first signaling is an SPS signaling, and the first time-frequency resource is located before the second time-frequency resource in time domain; the first signaling comprises first configuration information, the first configuration information is applicable to the first radio signal, and the first configuration information comprises at least one of occupied frequency-domain resources, an MCS and a HARQ process number; the first configuration information is used to determine the occupied frequency-domain resources for the first radio signal, the MCS for the first radio signal, and the HARQ process number for the first radio signal; the second signaling is used for determining a first multi-antenna related parameter, and the first multiantenna related parameter is applicable to the first radio signal; and a receiver of the first signaling comprises a first terminal;
- wherein the second signaling indicates a Transmission Configuration Indicator (TCI), the TCI indicates the first multiantenna related parameter; the second signaling comprises second configuration information, and the second configuration information comprises at least one of occupied frequency domain resources, an MCS or a HARQ process number; and the second configuration information is applicable to the third radio signal, the third radio signal is unrelated to the first configuration information.

17. The base station according to claim 16, wherein the third transceiver transmits a second radio signal; time-domain resources occupied by the second radio signal are located before time-domain resources occupied by the second time-frequency resource, the first configuration information is applicable to the second radio signal, and the second radio signal is unrelated to the first multiantenna related parameter.

18. The base station according to claim 16, wherein
the first transmitter transmits a third signaling; the second signaling comprises Q fields, the Q being a positive integer greater than 1, only a first field among the Q fields is used for the first terminal, the first field is one of the Q fields, and the third signaling is used for determining the first field from the Q fields.

19. The base station according to claim 16, wherein the first transmitter transmits first information; the first information is used for determining a target time unit set, and the target time unit set comprises T time units, the T being a positive integer greater than 1; the base station transmits the first radio signal in a first time unit, and the first time unit belongs to the target time unit set.

20. The base station according to claim 16, wherein the first signaling is downlink control information for downlink grant.

* * * * *